United States Patent [19]

Barra et al.

[11] Patent Number: 5,602,237

[45] Date of Patent: Feb. 11, 1997

[54] 1:2 METAL COMPLEXES OF POLYAZO DYES HAVING A SULPHO SUBSTITUTED 1-HYDROXY-2-NAPHTHYL GROUP AS THE COUPLING COMPONENT AND THEIR USE AS DYESTUFFS

[75] Inventors: Jordi B. Barra; Jose R. Sorolla, both of Barcelona, Spain

[73] Assignee: Sandoz Ltd., Basle, Switzerland

[21] Appl. No.: 412,670

[22] Filed: Mar. 29, 1995

[30] Foreign Application Priority Data

Mar. 30, 1994 [GB] United Kingdom ............... 9406289

[51] Int. Cl.[6] .................. C09B 45/26; C09B 45/30; C09B 45/32; D06P 1/10
[52] U.S. Cl. .................. 534/718; 534/700; 534/701; 534/704; 534/705; 534/707; 534/709
[58] Field of Search ........................ 534/718, 700, 534/701, 704, 705, 706, 707, 709

[56] References Cited

U.S. PATENT DOCUMENTS 2,861,985  11/1958  Ischer et al. ........................ 534/718
3,399,187  8/1968  Durig et al. ........................ 534/718

Primary Examiner—Floyd D. Higel

[57] ABSTRACT

The invention provides a 1:2 metal complex in which at least one of the complexants is a polyazo compound of formula

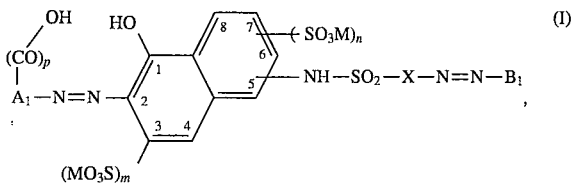

wherein —$A_1$—$(CO)_p$—OH signifies the radical of a diazo component of formula $H_2N$—A—$(CO)_p$—OH, in which the substituent —$(CO)_p$—OH is in ortho-position to the diazotizable amino group —$NH_2$, —A— is the ortho-bivalent radical and p signifies 0 or 1, or a modified derivative thereof, —X— signifies an aromatic bivalent radical, —$B_1$ signifies the radical of a coupling component HB, or a modified derivative thereof, m signifies 0 or 1, n signifies 0, 1 or 2 and M signifies hydrogen or a cation, with the proviso that m+n=1 or 2, or a mixture of such complexes and to the use thereof as dyestuffs, in particular for the dyeing of a substrate dyeable with anionic dyes, especially of leather or pelts.

23 Claims, No Drawings

1:2 METAL COMPLEXES OF POLYAZO DYES HAVING A SULPHO SUBSTITUTED 1-HYDROXY-2-NAPHTHYL GROUP AS THE COUPLING COMPONENT AND THEIR USE AS DYESTUFFS

It has been found that particular polyazo dye metal complexes as defined below have surprisingly good properties as dyestuffs, especially for the dyeing of substrates dyeable with anionic dyes, in particular for leather and pelts.

The invention relates to the defined metal complex dyes, their production and their use.

The invention thus provides a 1:2 metal complex dye in which at least one of the complexants is a polyazo compound of formula

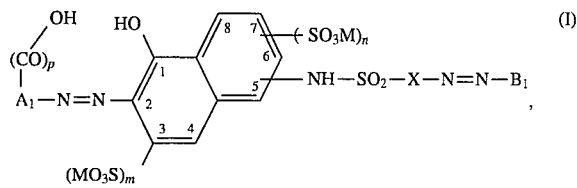

wherein

—$A_1$—$(CO)_p$—OH signifies the radical of a diazo component of formula $H_2N$—A—$(CO)_p$—OH, in which the substituent —$(CO)_p$—OH is in ortho-position to the diazotizable amino group —$NH_2$, —A— is the ortho-bivalent radical and p signifies 0 or 1, or a modified derivative thereof, —X— signifies an aromatic bivalent radical, —$B_1$ signifies the radical of a coupling component HB, or a modified derivative thereof, m signifies 0 or 1, n signifies 0, 1 or 2 and M signifies hydrogen or a cation, with the proviso that m+n=1 or 2, or a mixture of such complexes.

Preferably X is an aromatic carbocyclic radical that may contain one or more, preferably one or two, aromatic rings which may be further substituted.

Advantageously X is a phenylene radical that may be further substituted (e.g. with $C_{1-4}$-alkyl, $C_{1-4}$-alkoxy or/and chlorine) or a naphthylene radical, which is preferably further unsubstituted. If X signifies naphthylene the —$SO_2$—group is preferably in its 1-position and the azo group is preferably in the position 3 or 4. If X signifies phenylene, the group —N=N—$B_1$ is preferably in meta- or para-position to the —$SO_2$— group, and if a further substituent is linked to this phenylene it is preferably in one of the available positions meta or para to —$SO_2$—.

Preferred compounds of formula (I) correspond to the following formulae:

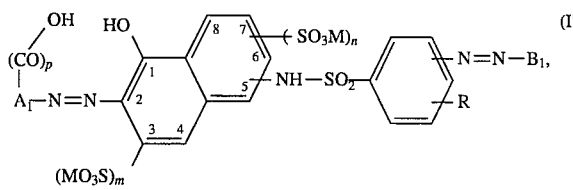

wherein R signifies hydrogen or methyl, and

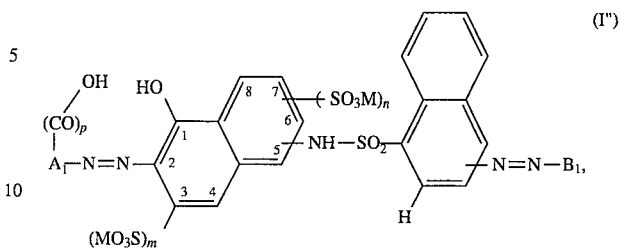

or mixtures thereof.

The —H in position ortho to —$SO_2$— in formula (I") indicates that this position is unsubstituted.

Among the above formulae (I') and (I") those of formula (I') are preferred.

The symbol R preferably signifies hydrogen.

The azo group linked to the —$SO_2$—bound aryl (preferably phenyl or naphthyl) radical X is advantageously in one of the positions meta or para to the —$SO_2$—group.

The compounds of the invention may be produced by synthetic processes analogous to known processes, i.e. by diazotization, coupling and metallization reactions and optionally other modification reactions as required.

The process for the production of the compounds of formula (I) or mixtures thereof is in particular characterized in that the diazocompound of a diazotizable amine of formula $H_2N$—A—$(CO)_p$—OH, or a mixture thereof, is coupled to a component of formula

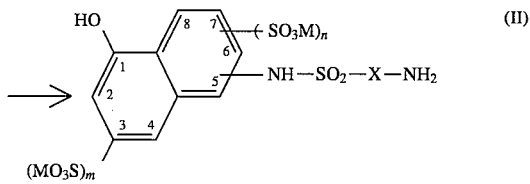

or to a mixture of components of formula (II), and the obtained compound of formula

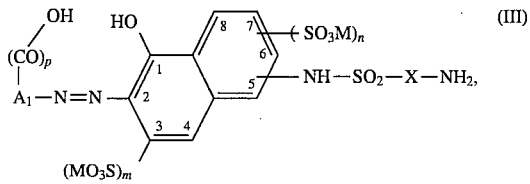

or mixture thereof, is diazotized and coupled to a coupling component H—B or to a mixture thereof, and optionally A or/and B is converted to $A_1$ or/and $B_1$ respectively.

The compounds of formula (II) may be synthetized in a manner known per se, e.g. by acylating the respective amino-1-naphthol mono- or di-sulphonic acid of formula

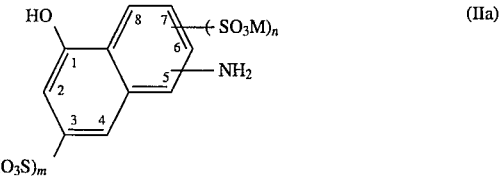

with an acid halide of formula

Hal—$SO_2$—X—L  (IIb), in which Hal signifies halogen (preferably bromine or especially chlorine), L signifies —$NO_2$ or —NH—$Ac_1$ and $Ac_1$ signifies a saponifiable protecting aliphatic acyl group, preferably the acyl radical of an aliphatic carboxylic acid, more preferably $C_{1-3}$-alkyl-CO—, most preferably acetyl, followed by conversion of L to —$NH_2$ by selective hydrolysis of —NH—$Ac_1$ to —$NH_2$ or reduction of —$NO_2$ to —$NH_2$ respectively.

The involved reactions may be carried in a manner conventional per se. The acylation takes place suitably under dehydrohalogenating conditions, advantageously in the presence of a suitable base, e.g. of an alkali metal hydroxide or/and carbonate, preferably at a pH in the range of 3 to 8, especially 4 to 6, and under mild temperature conditions, e.g. at a temperature in the range of 0° to 70° C., preferably 20° to 60° C. The selective hydrolysis of —NH—$Ac_1$ to —$NH_2$ takes place advantageously under basic conditions (preferably at a pH in the range of 11 to 14, e.g. with NaOH, KOH or/and $Na_2CO_3$) with controlled heating, preferably at a temperature in the range of 60° to 90° C. The reduction of —$NO_2$ to —$NH_2$ may be carried out preferably under mild conditions, e.g. with a sulphide or, analogously to the nitroaryl reduction method of Béchamp, with iron or iron(II)-salts and diluted acids, suitably under mild temperature conditions, e.g. in the range of 10° to 50° C.

As amino-1-naphthol sulphonic acids of formula (IIa) there may be employed known compounds, mainly 5-amino-1-naphthol-3-sulphonic acid (M-acid), 6-amino-1-naphthol-3-sulphonic acid (I-acid or J-acid), 7-amino-1-naphthol-3-sulphonic acid (γ-acid), 8-amino-1-naphthol-5-sulphonic acid (S-acid or Chicago-acid), 8-amino-1-naphthol-3,6-disulphonic acid (H-acid), 8-amino-1-naphthol-3,5-disulphonic acid (K-acid), 7-amino-1-naphthol-3,6-disulphonic acid (Columbia-acid), 6-amino-1-naphthol-3,5-disulphonic acid (Sulpho-I-acid) and 8-amino-1-naphthol-5,7-disulphonic acid (SS-acid or Chicago-SS-acid), among which J-acid and γ-acid are preferred.

Alternatively the compounds of formula (III) may also be produced by first coupling the diazo compound of an amine of formula HO—$(CO)_p$—A—$NH_2$ or a mixture thereof to a coupling component of formula (IIa) or to a mixture thereof, to give a compound of formula

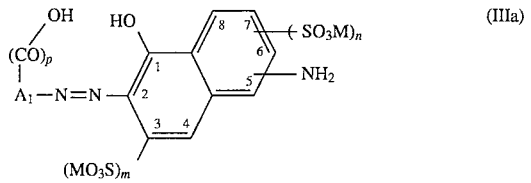

(IIIa)

or a mixture thereof, which is then acylated with a compound of formula (IIb).

The symbol $A_1$ may signify the ortho-bivalent radical of any diazo component suitable for the production of azodyes, or a modified derivative thereof. In particular HO—$(CO)_p$—$A_1$— may signify the radical of a diazo component that may optionally contain a further azo group, e.g. a radical HO—$(CO)_p$—A'— deriving from the diazotization of an amine of formula HO—$(CO)_p$—A'—$NH_2$, or a group of formula HO—$(CO)_p$—A''(N=N—$B_1$)— which in particular may derive from the diazotization of an amine of formula HO—$(CO)_p$—A''($NH_2$)$Y_o$ (if A'=signifies $Y_o$—A''=), in which $Y_o$ signifies —$NO_2$ or —NH—Ac and Ac signifies a protecting aliphatic acyl group, coupling to a component of formula (II) or to a mixture thereof and, upon conversion of $Y_o$ to —$NH_2$, diazotizing and coupling to H—B. The radical HO—$(CO)_p$—$A_1$— may also be the radical of a component derived from the bisdiazotization of a diamine of formula $H_2N$—A''($NH_2$)—$(CO)_p$—OH and coupling of both diazonium groups to compounds of formula (II), to give the respective disazo or higher polyazo compounds. Where $A_1$ contains one or more azo groups these may e.g. derive from previous diazotization and coupling reactions and optionally other suitable reactions (such as the hydrolysis of an acylated amino group or the reduction of a nitro group to give a primary amino group) to give as HO—$(CO)_p$—A—$NH_2$ an azo group-containing compound that contains a diazotizable primary amino group.

Preferably HO—$(CO)_p$—A— is HO—$(CO)_p$—A'—, and HO—$(CO)_p$—A'— preferably is the radical of a diazo component of the benzene or/and naphthalene series containing 1 to 4 aromatic rings (a naphthalene radical being counted as two aromatic rings) and which, if it contains 2 to 4 aromatic rings, may contain a heteroatomic bridge between two non condensed aromatic rings.

The heteroatomic bridge between two aromatic rings in A is preferably a nitrogen-containing bridge, especially an azo group, an imino bridge or an amido bridge (e.g. carbonylamino or sulphonylamino); the aromatic rings in A may be substituted with substituents conventional in diazo components in azo dyes, especially in anionic (poly)azo dyes.

Preferably A is of the benzene series and contains 1 to 3, more preferably 1 or 2 benzenic rings, and if it contains more than 1 ring these are linked advantageously over a heteroatomic bridge which is preferably not an azo group.

Suitable preferred amines HO—$(CO)_p$—A—$NH_2$ are, in particular, those of the following formulae

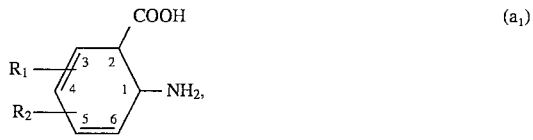

(a₁)

(a₂)

and

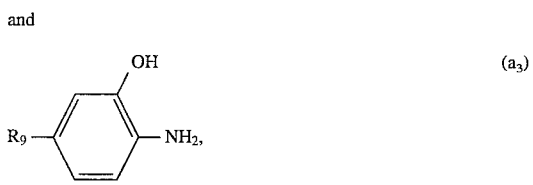

(a₃)

wherein $R_1$ signifies hydrogen, nitro, —$SO_3M$ or —$SO_2NR_3R_4$, $R_2$ signifies hydrogen, nitro, —$SO_3M$ or —$SO_2NR_3R_4$, $R_3$ signifies hydrogen, $C_{1-4}$-alkyl, $C_{1-3}$-alkylene-$R_5$ or $C_{2-3}$-hydroxyalkyl, $R_4$ signifies hydrogen, $C_{1-4}$-alkyl, $C_{1-3}$-alkylene-$R_5$, $C_{2-3}$-hydroxyalkyl, benzyl, or a radical of formula

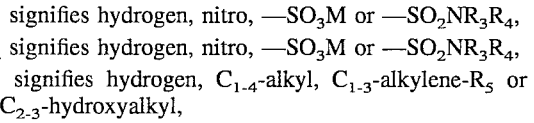

(c₁)

$R_5$ signifies nitrile, carbamoyl or —COOM, $R_6$ signifies hydrogen, methyl, chlorine, nitro, —COOM or —$SO_3M$, $R_7$ signifies hydrogen, halogen, nitro, —$SO_3M$, —$SO_2NR_3R_4$, methylsulphonyl, $C_{1-4}$-alkyl or —NH—Ac, $R_8$ signifies hydrogen, halogen, nitro, —$SO_3M$, —$SO_2NR_3R_4$, methylsulphonyl, $C_{1-4}$-alkyl or —NH—Ac, $R_9$ signifies nitro, —$SO_3M$ or —$SO_2NR_3R_4$, and Ac signifies an aliphatic acyl group.

Of the alkyl and alkoxy groups with 1 to 4 carbon atoms, the lower molecular weight ones are preferred, in particular ethyl, methyl, ethoxy and methoxy. Halogen may in particular be fluorine, chlorine or bromine of which fluorine and, before all, chlorine are preferred.

$R_2$ preferably signifies hydrogen. According to a preferred feature in formula ($a_1$) the position 6 is unsubstituted and, more preferably, also the position 3 is unsubstituted.

$R_3$ preferably signifies hydrogen.

$R_4$ advantageously signifies hydrogen, methyl, ethyl, hydroxyethyl or a radical of formula ($c_1$), in which $R_6$ preferably signifies hydrogen or carboxy.

The aliphatic acyl group Ac advantageously signifies the radical of a low molecular weight aliphatic carboxylic acid, preferably of an alkanoic acid with 2 to 4 carbon atoms, more preferably acetyl or propionyl, of which acetyl is preferred.

In formula ($a_2$) preferably at least one of $R_7$ and $R_8$ has a significance other than hydrogen, more preferably $R_8$ has a significance other than hydrogen and $R_7$ signifies hydrogen, a nitro group or a sulpho group. Advantageously at most one of $R_7$ and $R_8$ in the same formula ($a_2$) signifies a sulpho group. A preferred subgroup of compounds of formula ($a_2$) are compounds of formula ($a_2'$), i.e. compounds of formula ($a_2$) in which the one of $R_7$ and $R_8$ signifies —$NO_2$ and the other a sulpho group.

Preferably $A_1$ contains at least one hydrophilic substituent, preferably a substituent selected from the group consisting of —$SO_3M$, —$SO_2NR_3R_4$ and —COOM, more preferably not more than one hydrophilic substituent per homocyclic aromatic nucleus.

H—B may be any coupling component, in particular of the benzene, naphthalene, heterocyclic or open-chain methylene-active series, and suitably contains at least one substituent that activates the compound H—B for coupling, in particular an aromatically bound or enolic, optionally etherified hydroxy group or an optionally substituted amino group, so that the coupling reaction may take place in the corresponding activated position of the molecule H—B.

Suitable coupling components H—B are, in particular, those of the following formulae

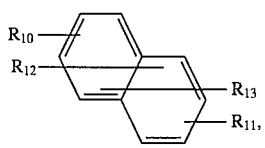 (b₁)

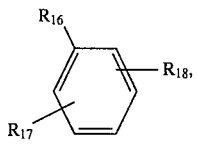 (b₂)

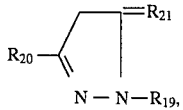 (b₃)

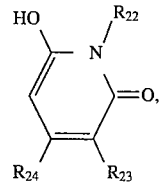 (b₄)

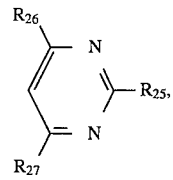 (b₅)

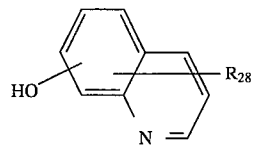 (b₆)

and $R_{29}$—G—CO—CH$_2$—CO—$R_{30}$, (b₇)

wherein $R_{10}$ signifies hydrogen, —$OR_{14}$ or —$NHR_{14}$, $R_{11}$ signifies —$OR_{14}$ or —$NHR_{14}$, $R_{12}$ signifies hydrogen, —$SO_3M$, —$SO_2NR_3R_4$, —COOM or —$CONR_3R_4$, $R_{13}$ signifies hydrogen, —$SO_3M$, —$SO_2NR_3R_4$, —COOM or —$CONR_3R_4$, $R_{14}$ signifies hydrogen, $C_{1-4}$-alkyl, Ac' or a radical of formula

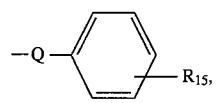 (c₂)

Ac' signifies the acyl radical of an aliphatic carboxylic acid,

Q signifies —CO—, —$SO_2$— or a direct bond, $R_{15}$ signifies hydrogen, methyl, —NH—Ac, —COOM or —$NO_2$, or, if in formula ($c_2$) Q signifies —CO— or —$SO_2$—, also —$NH_2$, $R_{16}$ signifies —OH or —$NH_2$, $R_{17}$ signifies hydrogen, $C_{1-4}$-alkyl, $C_{1-4}$-alkoxy, —OH, —NR'R" or —NH—Ac, $R_{18}$ signifies hydrogen, $C_{1-4}$-alkyl or $C_{1-4}$-alkoxy, R' and R", independently, signify hydrogen, $C_{1-2}$-alkyl or $C_{2-3}$-hydroxyalkyl, $R_{19}$ signifies hydrogen, sulphonaphthyl or a radical of formula

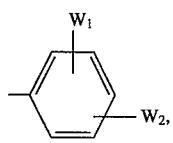 (c₃)

$W_1$ signifies hydrogen, halogen, methyl, methoxy or —COOM, $W_2$ signifies hydrogen, halogen, trifluoromethyl, nitrile, nitro, —COOM, —$SO_3M$ or —$SO_2NR_3R_4$, $R_{20}$ signifies $C_{1-4}$-alkyl, phenyl, —COOM, —$CONR_3R_4$, —$COOCH_3$ or —$COOC_2H_5$, $R_{21}$ signifies =O or =NH, $R_{22}$ signifies hydrogen, unsubstituted amino, phenylamino, sulphonaphthyl, open-chain $C_{1-8}$-alkyl, $C_{6-9}$-cycloalkyl, carboxy-($C_{1-4}$-alkyl), $C_{2-4}$-alkyl substituted with hydroxy, methoxy, ethoxy or a sulpho group in one of the positions β to ω, or a radical of formula ($c_3$), $R_{23}$ signifies hydrogen, nitril, acetyl, —COOM, carbamoyl, —SO$_3$M, pyridinio or 2-methylpyridinio, in which, where $R_{23}$ stands for pyridinio or orthomethylpyridinio, any of the sulpho groups present in the molecule may be in the form of the anion —SO$_3^-$ to form the counterion in the form of the inner salt, $R_{24}$ signifies hydrogen, hydroxy, methyl, carboxy, phenyl, sulphomethyl or carbamoyl, $R_{25}$ signifies hydroxy, primary amino, nitrilamino, thiol or a radical of formula

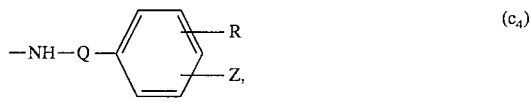

($c_4$)

$R_{26}$ signifies hydroxy or primary amino, $R_{27}$ signifies hydroxy or primary amino, $R_{28}$ signifies hydrogen, methyl, chlorine, chloromethyl or chloroacetyl, G signifies —O—, —NH— or the direct bond, $R_{29}$ signifies naphthyl, sulphonaphthyl or disulphonaphthyl or a radical of formula ($c_3$), $R_{30}$ signifies $C_{1-4}$-alkyl and Z signifies hydrogen, —NH$_2$, —OH, $C_{1-4}$-alkoxy, a mono- or di-($C_{1-4}$-alkyl)-amino group or an acylamino group.

The aliphatic acyl radical Ac' in the significance of $R_{14}$ may be the radical of any aliphatic carboxylic acid as can be introduced by acylation, in particular of a $C_{2-12}$-alkanoic, primary, monocarboxylic acid, preferably such as stated above for Ac, especially $C_{2-4}$-alkanoyl, most preferably acetyl.

If $R_{15}$ signifies —COOM, Q in formula ($c_2$) signifies in particular —CO—. If in formula ($c_2$) Q signifies a direct bond, $R_{15}$ preferably signifies hydrogen. If in formula ($c_2$) Q signifies —SO$_2$—, $R_{15}$ preferably signifies methyl, acetylamino or —NH$_2$. If in formula ($c_2$) Q signifies —CO—, $R_{15}$ preferably signifies hydrogen or —NO$_2$.

In formula ($b_1$) —OR$_{14}$ preferably signifies hydroxy and —NHR$_{14}$ preferably signifies —NHR$_{14}$', where $R_{14}$' signifies hydrogen, methyl, acetyl or a radical of formula ($c_2$). Preferably $R_{11}$ signifies hydroxy or —NHR$_{14}$' and $R_{10}$ signifies hydrogen or, where $R_{11}$ signifies —OH, also a group —NHR$_{14}$'. More preferably either $R_{11}$ signifies hydroxy and $R_{10}$ signifies hydrogen or —NHR$_{14}$', or $R_{11}$ signifies —NHR$_{14}$' and $R_{10}$ signifies hydrogen. $R_{12}$ preferably signifies hydrogen, —SO$_3$M, —COOM or —CONH$_2$. $R_{13}$ preferably signifies hydrogen or —SO$_3$M, more preferably hydrogen.

If in formula ($b_2$) $R_{17}$ signifies hydroxy, —NR'R" or —NH—Ac, it is preferably in meta-position to $R_{16}$ and $R_{18}$ preferably signifies hydrogen. If $R_{17}$ signifies $C_{1-4}$-alkyl or $C_{1-4}$-alkoxy it may be in any of the available positions ortho, meta and para to $R_{16}$. More preferably $R_{16}$ signifies hydroxy. Advantageously $R_{18}$ signifies hydrogen.

Of the alkyl and alkoxy radicals with 1 to 4 carbon atoms, also in B the lower molecular ones are preferred (analogously as in A), more specifically ethyl, methyl, ethoxy and methoxy. In the $C_{2-3}$-hydroxyalkyl radicals the hydroxy group is preferably in β-position.

In formula ($b_3$) $R_{19}$ preferably signifies a radical of formula ($c_3$). In formula ($c_3$)—in the significance of $R_{19}$—preferably at least one of $W_1$ and $W_2$ signifies hydrogen, more preferably $W_1$. $R_{20}$ preferably signifies $C_{1-4}$-alkyl, more preferably methyl. $R_{21}$ preferably signifies oxygen.

The open-chain $C_{3-8}$-alkyl radicals in the significance of $R_{22}$ may be linear or branched, if they contain 6 to 8 carbon atoms they are preferably branched; the cycloalkyl radicals in the significance of $R_{22}$ are preferably cyclohexyl, which may be substituted with 1 to 3 methyl groups, more preferably it is unsubstituted cyclohexyl. The carboxy-substituted $C_{1-4}$-alkyl group preferably is carboxymethyl or β-carboxyethyl. The substituent (hydroxy, methoxy, ethoxy, sulpho) at the $C_{2-4}$-alkyl, in the significance of $R_{22}$, is preferably in β-position. If $R_{22}$ signifies a radical of formula ($c_3$) $W_1$ preferably signifies hydrogen and $W_2$ preferably signifies carboxy, sulpho or trifluoromethyl. Preferred significances of $R_{22}$ are hydrogen, a radical of formula ($c_3$), $C_{1-8}$-alkyl, $C_{2-3}$-hydroxyalkyl and $C_{6-9}$-cycloalkyl.

$R_{23}$ preferably signifies hydrogen, a sulpho group or one of the stated nitrogen-containing substituents.

$R_{24}$ preferably has a significance other than hydrogen, more preferably methyl.

In formula ($b_5$) preferably at least one of $R_{26}$ and $R_{27}$ signifies hydroxy, more preferably both $R_{26}$ and $R_{27}$ signify hydroxy groups.

If in formula ($b_5$) $R_{25}$ signifies a radical of formula ($c_4$), preferably —NH—Q— signifies a group —NH—SO$_2$—.

In formula ($b_6$) the hydroxy group preferably is in position 8. If $R_{28}$ is other than hydrogen it is preferably in position para to the 8-positioned hydroxy group. $R_{28}$ preferably signifies hydrogen or methyl, more preferably hydrogen.

In formula ($b_7$) G preferably signifies —NH—. $R_{30}$ is preferably methyl. In the significances of $R_{29}$ are preferred radicals of formula ($c_3$), especially those in which $W_1$ signifies hydrogen. Most preferably also $W_2$ is hydrogen, i.e. $R_{29}$ is unsubstituted phenyl.

The coupling component radical B preferably contains up to three rings (homocyclic rings, heterocyclic rings and optionally a cycloaliphatic ring—a naphthalene radical being calculated as two rings), more preferably B contains one or two of such rings.

Of the above compounds of formula (I) are preferred those in which A and B together contain 2 to 6, especially 2 to 4 rings and one or two hydrophilic groups, the hydrophilic groups for $A_1$ being as indicated above and for B being as indicated above for $A_1$ or also a cationic group, in particular a pyridinium or orthomethylpyridinium group as stated in the significances of $R_{23}$ if B is the radical of a coupling component of formula ($b_4$).

Where M signifies a cation this may be any cation conventional per se in anionic metal complex dyes, conveniently a non-chromophoric cation, in particular an alkali metal cation (especially lithium, sodium or/and potassium) or an ammonium cation (e.g. unsubstituted ammonium or ammonium mono-, di- or tri-substituted with $C_{1-2}$-alkyl or/and $C_{2-3}$-hydroxyalkyl), alkali metal cations being preferred. The metal complex dyes of the invention may advantageously also be in partial salt form, i.e. where some of the M are salt-forming cations and some are hydrogen (or hydroxonium).

Diazotization of amines of formula HO—(CO)$_p$—A—NH$_2$ and of formula (III) may be carried out under conventional conditions, in particular with a nitrite (preferably sodium nitrite) in acidic aqueous medium (preferably in the presence of hydrochloric acid) and at low temperatures, e.g. in the range of −5° C. to +10° C., preferably 0° to 5° C.

The coupling reactions of the diazonium compounds to the respective coupling components may also be carried out in a manner conventional per se, advantageously at temperatures in the range of −5° C. to +30° C., preferably below 25° C., more preferably in the range of 0° to 10° C. The coupling of the diazo compound of an amine of formula HO—(CO)$_p$—A—NH$_2$ or a mixture thereof to the compound of formula (II) may be carried out under distinctly acidic to strongly basic pH conditions, e.g. at pH in the range of 4 to 12, preferably under basic conditions, more preferably at a pH in the range of 8 to 11. The coupling of the diazo compound of an amine of formula (III) or of a mixture thereof to the corresponding coupling components H—B may be carried out under distinctly acidic to strongly basic pH conditions, advantageously in the range of pH 4 to pH 12, in particular to coupling components of formula (b$_1$), (b$_2$), (b$_4$), (b$_5$), (b$_6$) or/and (b$_7$) preferably at pH values in the range of 9 to 11, and to coupling components of formula (b$_3$) preferably in the pH range of 5 to 11.

The reactions may be carried out in aqueous medium or also in aqueous/organic medium, the organic medium being preferably a water-miscible inert solvent (e.g. an alcohol or dioxane).

The acylation of an amino group with an acid halide advantageously takes place in the presence of a dehydrohalogenating agent, in particular in the presence of an alkali metal hydroxide, and at temperatures suitably in the range of 15° to 50° C., preferably 20° to 40° C.

By selecting the pH-value during the coupling reaction and where more than one coupling position is available, the coupling position may be influenced or determined by suitable selection of the pH value.

The metallizable compounds of formula (I) or/and (III) may be converted to the respective metal complexes by metallization with 1:2-complex-forming metal compounds, optionally in combination with further complex-forming ligands H—Lg'—H, and optionally with further reactions.

The 1:2 metal complexes of the invention may, in particular, be represented by the following formula

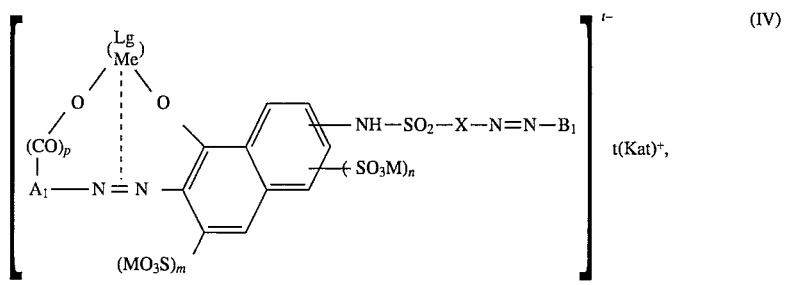

wherein
Me signifies a 1:2 complex-forming metal,
Lg signifies a ligand or a group of ligands,
t is the number of negative charges of the Me-complex and (Kat)$^+$ signifies a counterion,
in particular The ligand H—Lg'—H may be any chromophoric or non-chromophoric complex-forming ligand or group of ligands, e.g. non-chromophoric ligands such as molecules of coordinatively linkable aliphatic polyamines (e.g. ethylene diamine or diethylene triamine) or hydroxycarboxylic acids (e.g. tartaric or salicylic acid), optionally together with water

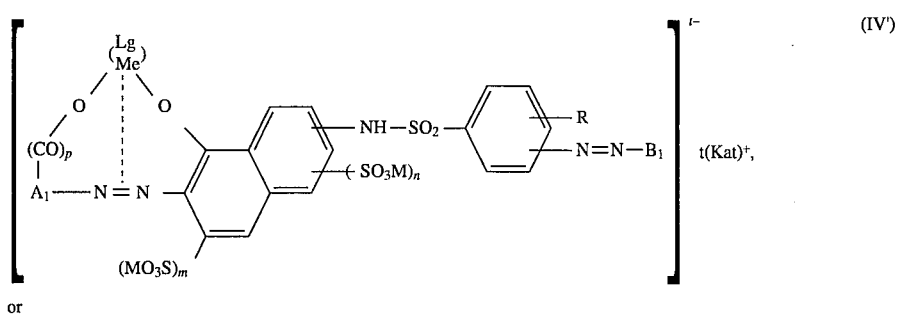

or

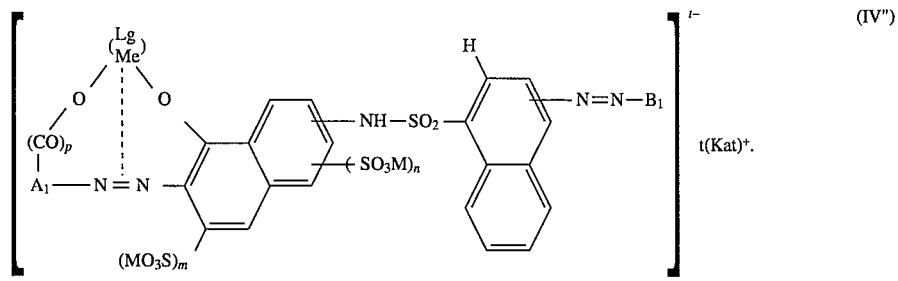

or/and ammonia, or chromophoric ligands such as a molecule of a metallizable azo compound, e.g. of the kind HO—(CO)$_n$—A$_1$—N=N—B$_1$ [where HO—(CO)$_n$—A$_1$— is e.g. the radical of a diazo component of formula HO—(CO)$_n$—A—NH$_2$ which is preferably of formula (a$_1$), (a$_2$) or (a$_3$), while B$_1$ contains a metallizable substituent in ortho position to the coupling position], or, according to a preferred feature, a further compound of formula (I), in particular (I") or preferably (I').

The 1:2 complex-forming metal may be any suitable metal, in particular chromium, cobalt, iron, manganese, titanium, zirconium (also zirconyl) or/and aluminium, of which are preferred chromium, cobalt and iron, especially cobalt and/or chromium, the latter being particularly preferred.

The number t depends on Me, Lg and the compound of formula (I) and may in particular be 0, 1 or 2. If any of Lg, B$_1$ or/and A$_1$ contains a covalently bound cationic group, e.g. a pyridinium group as mentioned above, their positive charges may equilibrate, at least in part, a corresponding number of negative charges of the complex, so that t is reduced accordingly. It is however preferred that in the dye molecules of the invention the covalently bound anionic groups prevail. Preferably t signifies t', i.e. 0 or 1, (Kat)$^+$ may be any cation as is formed in the synthesis of the respective dye, e.g. as indicated above for M, and depends thus also on Lg and Me and further also on the complex forming reaction conditions (namely the pH and the employed solvent), or a cation introduced by ion exchange; in the free acid form it is indicated as a hydroxonium ion.

A preferred group of metal complexes are those of the formula

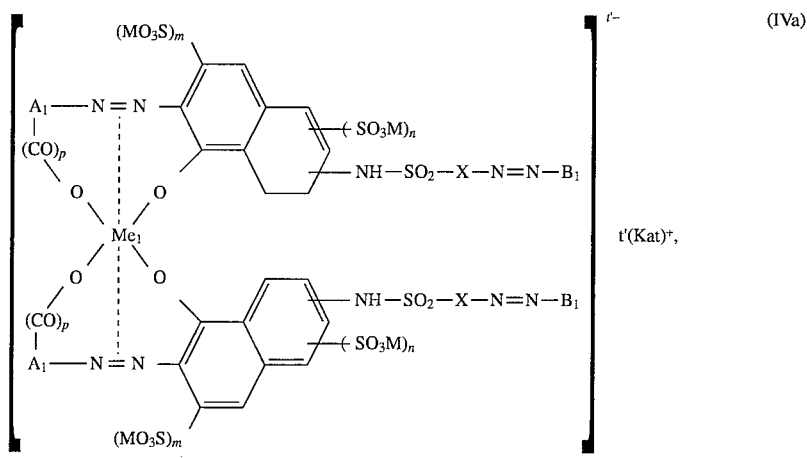

wherein Me$_1$ signifies iron, cobalt or chromium, especially

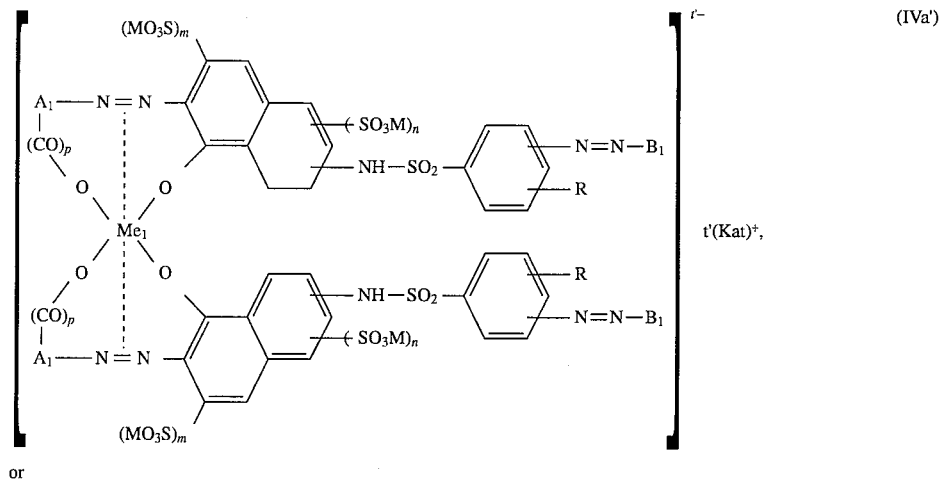

or

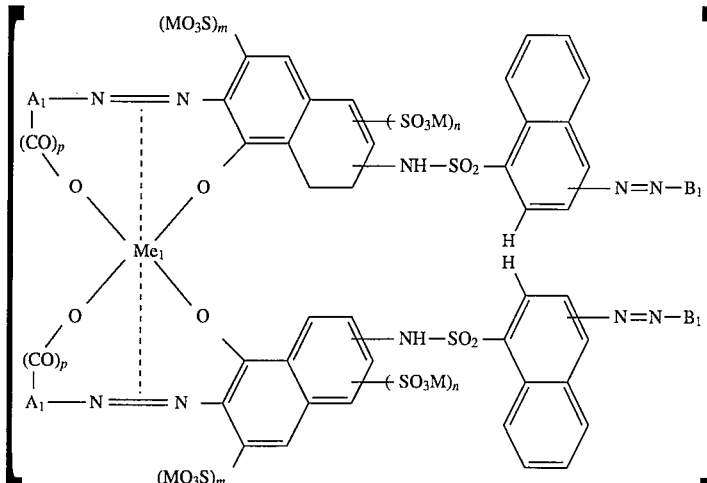

(IVa'')

or a mixture of such complexes.

The process for the production of the metal complexes or mixtures stated above is in particular characterized in that a) at least one metallizable compound of formula (I) as defined above and optionally one or more further complex-forming ligands are reacted with a 1:2 metal-complex-forming metal compound, or b) a 1:2 metal complex compound of formula

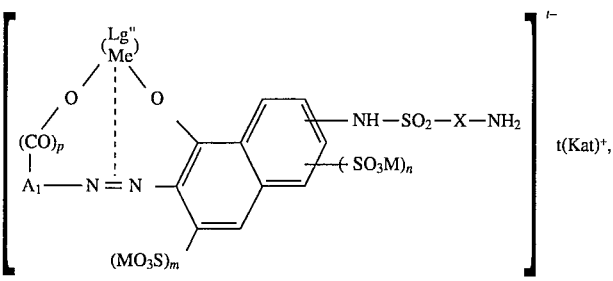

(V)

wherein Lg'' has a significance of Lg or is a ligand which, after conversion of —$NH_2$ to —N═N—$B_1$ and optionally of A to $A_1$, leads to Lg, or a mixture thereof, is converted to a metal complex of the invention, in particular of formula (IV), or to a mixture thereof.

Preferred complexes of formula (V) are of formula

The metal complexes of formula (V) may be synthetized by metallizing the respective compounds of formula (III) and ligands H—Lg'''—H, where H—Lg'''—H has one of the significances of H—Lg'—H or is a compound that after metallization and conversion of —$NH_2$ to —N═N—B leads to Lg, or by acylating with a compound of formula (IIb) a corresponding precursor metal complex of a compound of formula (IIIa) and a suitable ligand leading to Lg'' [directly or upon acylation with a compound of formula (IIb)].

The metallization to metal complexes may be carried out in analogy to known metal complex formation reactions.

For the metallization, in particular of the compounds of formula (I) or (III), there may be employed conventional suitable metal compounds e.g. acetates or hydrosoluble salts

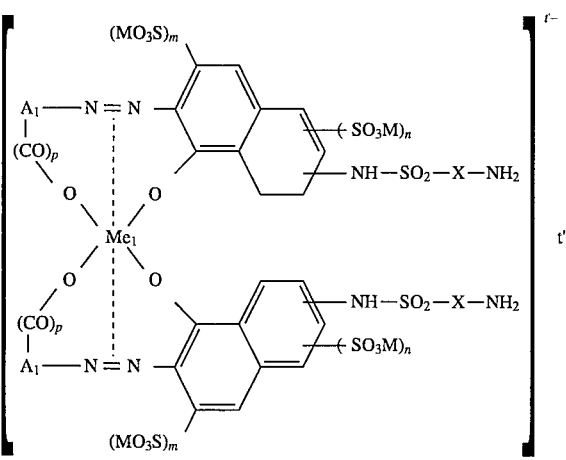

(Va)

of mineral acids, in particular chromium trichloride, cobalt dichloride, iron di- or trichloride, chromium trifluoride, manganese chloride, acetate or sulphate, aluminium chloride, titanium chloride, zirconium tetrachloride or sulphate, zirconyl chloride, cobalt sulphate or nitrate, iron-II- or -III-sulphate, chromium sulphate, chromium or cobalt acetate, potassium chromium sulphate, ammonium chromium sulphate (e.g. chrome alums) and optionally, with the addition of a reducing agent e.g. of glucose, also sodium or potassium chromate or bichromate.

The chromation may be carried out directly up to the 1:2 chromium complex stage or by degrees over the 1:1 chromium complex stage and then further complexation up to the 1:2 chromium complex stage.

Chromation may be carried out in aqueous medium, preferably at pH values in the range of 2 to 10 and temperatures in the range of 95° to 130° C., if necessary under superatmospheric pressure. Optionally the reaction may be carried out with addition of organic solvents or also only in organic solvents. Suitable organic solvents are preferably those that are miscible with water, have a boiling point above 100° C. and in which the azo dyes and the metal salts are soluble, e.g. glycols, ether alcohols or amides (e.g. ethylene glycol, polyethylene glycol, β-ethoxyethanol, β-methoxyethanol, formamide or dimethylformamide). For the production of asymmetrical 1:2 chromium complex compounds the chromation may be carried out gradually, synthetizing first the 1:1 chromium complex of one of the complexants and then synthetizing from this with a second complexant the 1:2 complex. The 1:1 chromium complexes may be produced in conventional manner, e.g. under analogous conditions as for the 1:2 chromium complexes, but preferably under stronger acidic pH-values, advantageously at pH<3. It is also of advantage to synthesize 1:2 chromium mixed complexes, e.g. by simultaneously metallizing different complexants of formula (I) and H—Lg'—H or by coupling the diazo compound of a complex of formula (V) to more than one coupling component H—B or by coupling the diazo compound of a mixture of complexes of formula (V) to one or more coupling components H—B.

Preference is given to 1:2 chromium complexes of symmetrical constitution, i.e. of formula (IVa) in which $Me_1$ signifies chromium and in which the two symbols $A_1$ have the same significance, the two symbols B have the same significance, the two symbols X have the same significance, each index m, n and p has the same significance as its homonymous index, the two radicals —NH—$SO_2$—X—N=N—$B_1$ are each in the position of the same numbering of the naphthalene nucleus and, if n≠0, the n sulpho groups in one of the two complexants are also each in the position of the same position-number as the corresponding sulpho group in the other of the two complexants.

The metallization of azocompounds of formula (I) or (III) to the respective iron-complexes, i.e. 1:2 iron complexes, may be carried out in conventional manner, suitably in aqueous medium, advantageously at pH-values in the range of 3.5 to 6.5, preferably 4 to 6, with heating. Preferably the metallization to iron complexes is carried out at temperatures in the range of 40° C. to reflux temperature, preferably 60° to 100° C.

The metallization of azocompounds of formula (I) or (III) to the corresponding 1:2-cobalt complexes, may be carried out in conventional manner, suitably in aqueous medium, advantageously at pH-values in the range of 9 to 12, preferably 10 to 11, optionally with heating. Preferably the metallization to cobalt complexes is carried out at temperatures in the range of 30° C. to 90° C., preferably 40° to 70° C.

Where a metal compound of a metal cation in bivalent form $Me^{2+}$ is used for complex formation, an oxidizing agent, e.g. $H_2O_2$, may be added in order to optimize the yield of complex formation of the metal with degree of oxidation=3 (=$Me^{3+}$).

Other metallizations may be carried out in analogous way, as conventional per se.

Upon completion of the required coupling and metallization and any further optional modification reactions the obtained dyes or mixtures thereof may be isolated from the mother-liquor in a manner conventional per se, e.g. by salting-out or by acidification with a strong mineral acid or e.g. by evaporation, upon dialysis with a suitable membrane. If desired, the dye may, upon isolation or dialysis, be blended with suitable blending agents conventional per se, e.g. with alkali metal salts (sodium carbonate, sodium sulphate or sodium chloride), with non-electrolyte blending agents (mainly urea or/and oligosaccharides, e.g. dextrin) or/and with anionic surfactants, in particular hydrocarbon sulphonates or other organic sulphonates, e.g. sulphonated castor oil, sulphosuccinates or lignin sulphonate. If a surfactant is employed, the weight ratio of the surfactant to the dye is advantageously in the range of 5:95 to 40:60. If desired, especially if the composition contains an anionic surfactant, as indicated above, it may be formulated with water as concentrated liquid dye compositions, preferably with a dry-substance content in the range of 10 to 70%, more preferably 20 to 50% by weight, referred to the weight of the composition.

The metal complex dyes of the invention serve as hydrosoluble dyes, especially as anionic dyes; they are suitable for the dyeing of substrates dyeable with hydrosoluble anionic dyes. They may be used in the form as has been synthesized and, if necessary, purified or even be blended with conventional blending agents (e.g. as stated above, in particular with inorganic salts, preferably sodium carbonate, sulphate or chloride, with non-electrolyte blending agents, preferably dextrin and/or urea, and optionally—for the production of granular or liquid forms—with corresponding suitable additives). The dyes may be used in any conventional form, e.g. as powder, liquid compositions or granules; for the production of especially electrolyte-poor compositions, the dyes may be purified, e.g. by dialysis, before any blending with non-electrolyte blending agents.

The dyes of the invention may be of a large choice of hues, depending on the substituents and their positions, and on Me and Lg, principally ranging from green shades to orange shades and to red shades (including also bluish red shades, yellow shades, brown shades and olive shades); there may, however, also be produced dyes of other shades, in particular ranging from blue shades to grey and to black shades (including also violet shades).

Any substrate that is dyeable with hydrosoluble dyes, in particular with anionic dyes, is suitable as a substrate that may be dyed with the metal complexes of the invention; these include natural and regenerated cellulose, polyurethanes, basically modified high polymers (e.g. basically modified polypropylene), natural or synthetic polyamides or anodized aluminium, in particular, however, leather substrates. The substrate to be dyed may be in any conventional form, e.g. in the form of loose fibres, filaments, yarns, woven or knitted goods, non-woven webs, carpets, half-ready-made and ready-made soft goods and tanned leather or pelts. The dyes may be employed in any desired concentration up to the saturation of the substrate.

The dyeing may be carried out by any conventional methods that are suitable for the substrate to be dyed, e.g. by exhaustion or impregnation methods (e.g. padding, spraying, foam application or application with a roller, or printing), preferably from aqueous medium; for synthetic substrates, the dye may optionally also be incorporated into the synthetic mass. Paper may be dyed in the pulp or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also wool-bearing skins and furs (e.g. woolled suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents [e.g. chromium, zirconyl or aluminium derivatives, quebracho, chestnut or mimosa extracts, aromatic syntans, polyurethanes, (co)polymers of (meth)acrylic acid compounds or melamine/, dicyanodiamide/ and/or urea/formaldehyde resins]. Thus leathers of very high to very low affinity for anionic dyes may be used.

The leathers may be of various thicknesses, thus, there may be used very thin leathers, such as book binder's leather or glove leather (nappa), leather of medium thickness, such as shoe upper leather, garment leather and leather for handbags, or also thick leathers, such as shoe-sole leather, furniture leather, leather for suitcases, for belts and for sport articles; woolled leathers and furs may also be used. After tanning and before dyeing, the pH of the leather is advantageously set to values in the range of 4 to 8 (the leather is "neutralized"); depending on the kind of the leather, there may be chosen an optimum pH range, e.g. for grain leather pH values in the range of 4 to 6, for suede leather and split velours and for very thin leathers pH-values in the range of 4.5 to 8, for intermediately dried suede leathers and intermediately dried split velours the pH may range in the scope of 5 to 8. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium bisulfite, of which sodium formate and ammonia are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, in particular in the temperature range of 20° to 80° C., preferably 25° to 70° C., milder temperature conditions, in particular in the range of 25° to 40° C., being preferred for the achievement of deeper penetrations and for the dyeing of woolled skins and furs. The pH-values of the dye-bath may, in general, range broadly, mainly from pH 8 to pH 3; in general the dyeing may be advantageously begun at higher pH-values and concluded at lower pH-values. Preferably the dyeing is carried out at pH-values $\geq 4$, in particular in the range of 8 to 4, and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants.

The metal complex dyes of the invention may, if desired, be employed in combination with conventional dyeing assistants, mainly non-ionic or anionic products (in particular surfactants, preferably hydrophilic polysaccharide derivatives, polyoxyethylated alkylphenols or alcohols, lignosulphonates or sulpho group-containing aromatic compounds).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil or wax, or chemically modified animal or vegetable fat or oil, which include in particular tallow, fish oils, neats-foot oil, olive oil, castor oil, rapeseed oil, cottonseed oil, sesame oil, corn oil and japanese tallow and chemically modified products thereof (e.g. hydrolysis, transesterification, oxydation, hydrogenation or sulphonation products), bees wax, chinese wax, carnauba wax, montan wax, wool fat, birch oil, mineral oils with boiling range within 300° and 370° C. (particularly the so-called "heavy alkylates"), soft paraffin, medium paraffin, vaselines and methyl esters of $C_{14-22}$-fatty acids; and synthetic leather fatting agents, including esters, in particular partial esters of polybasic acids (e.g. phosphoric acid) with optionally oxyethylated fatty alcohols. Of the above mentioned the methyl ester, the sulphonation products and the phosphoric acid partial esters are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent.

The treated substrate may then be further treated in conventional manner, e.g. rinsed or/and washed, drained, dried and cured.

According to the invention there may be obtained metal complex dyes that display, even with a relatively low number or even absence of hydrosolubilizing substituents in $A_1$ and $B_1$, a high solubility in water, especially where the dyes are in alkali metal salt form; they are distinguished by their stability to electrolytes (in particular inorganic ions), specifically also to bases and acids, and are also distinguished, especially on leather, by their build-up and a high degree of insensitivity to variations of the affinity of the leather towards anionic dyes, very level dyeings of outstanding penetration, high colour-yield and very intensive shade being obtainable. The dyeings particularly on leather have excellent fastness properties, for example wet-fastnesses, fastness to rubbing and especially light fastness, and stability to PVC migration. They are readily combinable with other dyes, in particular such of similar tinctorial behaviour. There may be obtained very level, intense, fine dyeings, grain side and flesh side being very evenly dyed, the shade of the dyeings on different kinds of leather being equal or very similar; in admixture with corresponding dyes with which the dyes of the invention are combinable, there may also be obtained very intense and regular dyeings of high yield and optimum fastnesses. By the choice of the substituents some of the properties of the dyes (e.g. solubility, shade, build-up, penetration, levelness etc.) may additionally be varied accordingly.

In the following Examples parts and percentages are, if not otherwise indicated, by weight; parts by weight relate to parts by volume as grams to milliliters. The temperatures are indicated in degrees Celsius. In the Application Examples the respective dyes are used in blended form containing 30% of the respective dye and the blending agent being Glauber's salt (sodium sulphate), the indicated dye quantities refer to the blended form, the other products employed in the Application Examples are commercially available products conventional in the treatment of leather. "C.I." stands for "Colour Index".

Synthesis of middle components of formula (II)

Middle component Mk. 1

23.9 parts of 1-hydroxy-6-aminonaphthalene-3-sulphonic acid (J-acid) are stirred with 50 parts of water and 4 parts of an aqueous 25% sodium hydroxide solution at 50° C. 30 parts of N-acetylsulphanilyl chloride are slowly added, keeping the pH at 4–5 with sodium carbonate. When the pH has stabilized in this range the temperature is increased to 80° C. and 80 parts of an aqueous 25% sodium hydroxide solution are added. After two hours the hydrolysis of the acetylamino group is completed. The pH of the composition is lowered to 9–10 by addition of aqueous 30% hydrochloric acid. The obtained aqueous composition is directly usable for further reaction in the following examples. If desired the obtained product can be isolated by acidification and suction filtered. It corresponds in the form of the free acid, to the formula

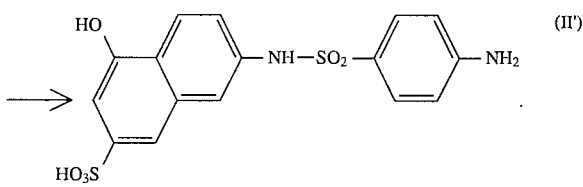

Middle component Mk. 2

23.9 parts of 1-hydroxy-7-aminonaphthalene-3-sulphonic acid (γ-acid) are stirred with 50 parts of water and 4 parts of an aqueous 25% sodium hydroxide solution at 50° C. 30 parts of N-acetylsulphanilyl chloride are slowly added, keeping the pH at 5–6 with sodium carbonate. When the pH has stabilized in this range the temperature is increased to 80° C. and 80 parts of an aqueous 25% sodium hydroxide solution are added. After two hours the hydrolysis of the acetylamino group is completed. The pH of the composition is lowered to 9–10 by addition of aqueous 30% hydrochloric acid. The obtained aqueous composition is directly usable for further reaction in the following examples. If desired the obtained product can be isolated by acidification and suction filtered. It corresponds in the form of the free acid, to the formula

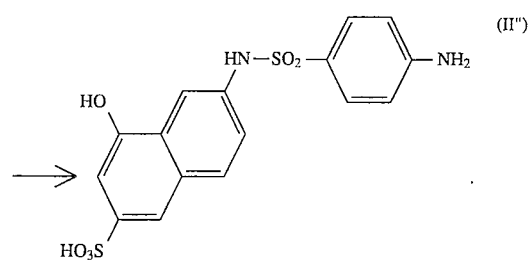

EXAMPLES 1

EXAMPLE 1.1.1

23.4 parts of 2-amino-4-nitro-1-phenol-6-sulphonic acid are diazotized in conventional way with $NaNO_2$ in the presence of hydrochloric acid and coupled to 39.4 parts of Mk. 1 at pH 9–10 and temperature 5°–10° C. After 1 hour the pH is lowered to 6 and the temperature is increased to 80° C. and at this temperature 12 parts of sodium acetate and 28 parts of chrome alum ($Cr^{3+}$-content=10%) are added and the mixture is heated under reflux for 2 hours. The end point of the chromation is determined by means of thin layer chromatography. When the chromation is complete, the obtained mixture is cooled with ice to 0°–5° C. and acidified by addition of 50 parts of an aqueous 30% hydrochloric acid solution. The obtained suspension of the 1:2 chromium complex of the monoazo compound is diazotized with 8 parts of sodium nitrite. When the diazotization reaction is completed the sodium nitrite in excess is destroyed by addition of 1 part of aminosulphonic acid. 14.4 parts of 2-naphthol are added and the pH is adjusted to 10 by the addition of an aqueous 25% sodium hydroxide solution. The formed chromium complex dye is salted out with sodium chloride, suction filtered, dried and milled. It is a black powder that dyes leather in brown shades. It corresponds in the form of the free acid to the formula

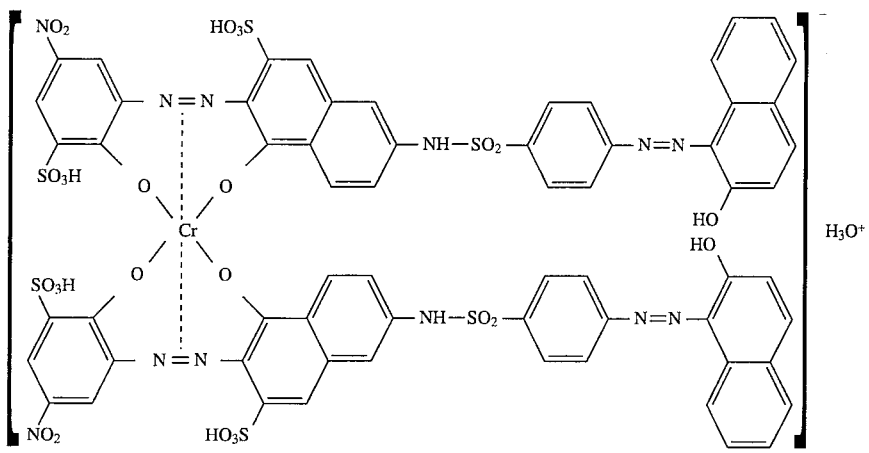

EXAMPLE 1.1.2

The procedure described in Example 1.1.1 is repeated with the difference that instead of the chromium complex there is produced the cobalt complex by carrying out the first coupling reaction as described in Example 1.1.1, then adjusting the pH to 11 by addition of an aqueous 25% sodium hydroxide solution, heating the mixture to 60° C., adding during 10 minutes 14 parts of cobalt sulphate heptahydrate, previously dissolved in 50 parts of water, and, immediately afterwards, slowly, 4 parts of hydrogen peroxide. When the cobaltation is complete the mixture is cooled with ice to 0°–5° C. and the further reactions are carried out as described in Example 1.1.1 for the chrome complex of the monoazo compound. The obtained cobalt complex is salted out with sodium chloride, suction filtered, dried and milled. There is obtained a black powder that dyes leather in brown-bordeaux shades. The cobalt complex corresponds in the form of the free acid to the formula

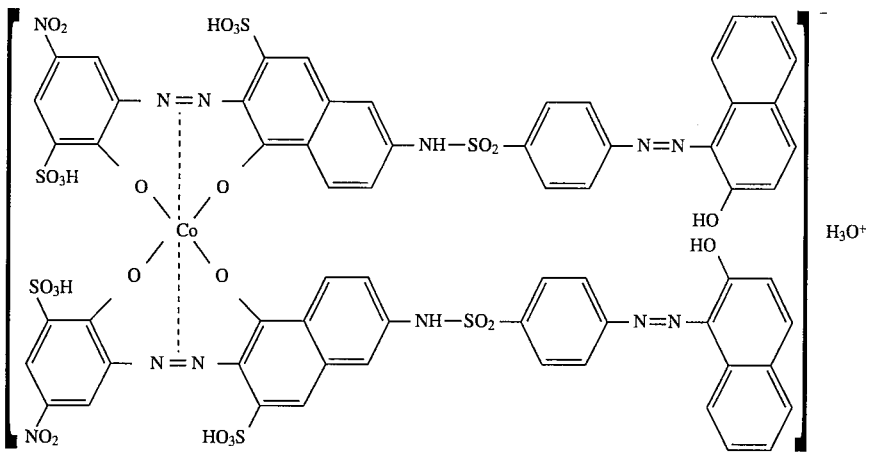

EXAMPLE 1.2.1

The procedure described in Example 1.1.1 is repeated, with the difference that, instead of Mk. 1, there is employed the same amount of Mk. 2. There is obtained the respective chromium complex as a black powder, that dyes leather in brown shades. The chromium complex corresponds in the form of the free acid to the formula

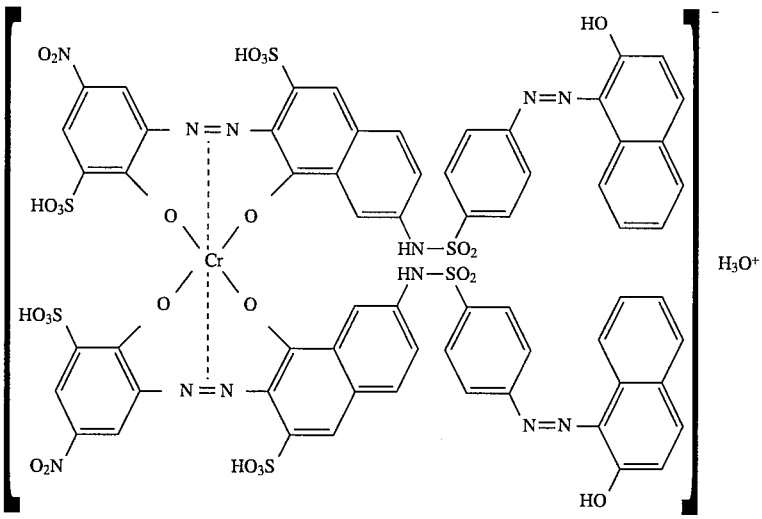

EXAMPLE 1.2.2

The procedure described in Example 1.1.2 is repeated, with the difference that, instead of Mk. 1, there is employed the same amount of Mk. 2. There is obtained the respective cobalt complex as a black powder, that dyes leather in brown-bordeaux shades. The cobalt complex corresponds in the form of the free acid to the formula

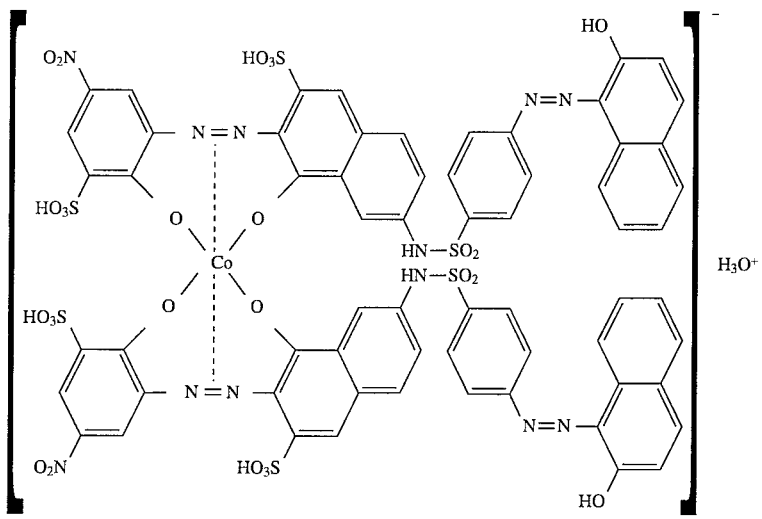

EXAMPLES 2 TO 25

The following tables contain further examples of disazo dye metal complexes of the invention, that can be synthetized analogously as described in Examples 1, but using instead of 2-amino-1-hydroxy-4-nitrobenzene-6-sulphonic acid (diazo component Dk. 1 of the following table) equimolar amounts of the other amines (diazo components numbered as Dk. 2 to 25 in the following tables) set out in the following tables; the employed middle components are Mk. 1 and Mk. 2 described above; the complex-forming metals are chromium and cobalt, as indicated. The shades of the dyeings obtained on leather with the respective 1:2 metal complexes is indicated under the relative headings indicating the complex-forming metal.

| | | Amines of formula ($a_2$) | | Shade on leather | | | |
|---|---|---|---|---|---|---|---|
| | | | | Mk. 1 | | Mk. 2 | |
| Ex. no. | Dk. no. | $R_7$ | $R_8$ | chromium | cobalt | chromium | cobalt |
| 1 | 1 | $-SO_3H$ | $-NO_2$ | brown | brown-bordeaux | brown | brown-bordeaux |
| 2 | 2 | $-NO_2$ | $-SO_3H$ | " | " | " | " |
| 3 | 3 | H | $-SO_3H$ | " | " | " | " |
| 4 | 4 | H | $-NO_2$ | " | " | " | " |
| 5 | 5 | H | $-SO_2-NH_2$ | " | " | " | " |
| 6 | 6 | H | $-SO_2-NH-\text{C}_6\text{H}_5$ | " | " | " | " |
| 7 | 7 | H | $-SO_2-NH-CH_3$ | " | " | " | " |
| 8 | 8 | H | $-SO_2-NH-CH_2-CH_2-OH$ | " | " | " | " |
| 9 | 9 | H | $-SO_2-NH-\text{C}_6\text{H}_4\text{-COOH}$ | " | " | " | " |
| 10 | 10 | H | Cl | " | " | " | " |
| 11 | 11 | H | $-CH_3$ | " | " | " | " |
| 12 | 12 | H | $-SO_2-CH_3$ | " | " | " | " |
| 13 | 13 | $-NO_2$ | $-SO_2-NH_2$ | " | " | " | " |
| 14 | 14 | $-NO_2$ | $-NO_2$ | " | " | " | " |

-continued

Amines of formula (a₃)

| Ex. no. | Dk. no. | $R_9$ | Shade on leather Mk. 1 chromium | Mk. 1 cobalt | Mk. 2 chromium | Mk. 2 cobalt |
|---|---|---|---|---|---|---|
| 15 | 15 | $-SO_3H$ | brown | brown-bordeaux | brown | brown-bordeaux |
| 16 | 16 | $-NO_2$ | " | " | " | " |
| 17 | 17 | $-SO_2-NH_2$ | " | " | " | " |
| 18 | 18 | $-SO_2-NH-CH_3$ | " | " | " | " |

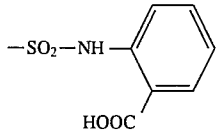

Amines of formula (a₁₁)

| Ex. no. | Dk. no. | $R_1$ | (position of $R_1$) | Shade on leather Mk. 1 chromium | Mk. 1 cobalt | Mk. 2 chromium | Mk. 2 cobalt |
|---|---|---|---|---|---|---|---|
| 19 | 19 | H | | brown | brown | brown | brown |
| 20 | 20 | $-SO_3H$ | (5) | " | " | " | " |
| 21 | 21 | $-SO_2-NH_2$ | (5) | " | " | " | " |
| 22 | 22 | $-SO_2-NH-C_6H_4-COOH$ (o) | (5) | " | " | " | " |
| 23 | 23 | $-SO_3H$ | (4) | " | " | " | " |
| 24 | 24 | $-NO_2$ | (4) | " | " | " | " |
| 25 | 25 | $-SO_2-NH_2$ | (4) | " | " | " | " |

EXAMPLES 26 TO 103

The following tables contain further examples of metal complex dyes of the invention, that can be synthetized analogously as described in Examples 1, but using instead of the coupling component 2-naphthol (coupling component Kk. 1 of the following table) equimolar amounts of the other coupling components (numbered as Kk. 2 to 40 in the following tables) set out in the following tables and the above diazo components Dk. 1 or 2 as set out in the following tables; the employed middle components are Mk. 1 and Mk. 2 stated above and the complex-forming metals are chromium and cobalt, as indicated. The shades of the dyeings obtained on leather with the respective 1:2 metal complexes is indicated under the relative headings indicating the complex-forming metal. In Examples 46 to 103 the coupling reactions to the coupling components Kk. 12 to 40 are carried out at a pH of 5.

Coupling components of formula (b₁₁)

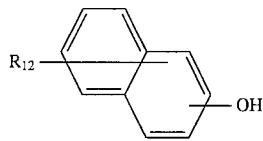

| Ex. no. | Kk. no. | position of −OH | R₁₂ | Dk. (position) | Dk. no. | Shade on leather Mk. 1 chromium | Mk. 1 cobalt | Mk. 2 chromium | Mk. 2 cobalt |
|---|---|---|---|---|---|---|---|---|---|
| 1 | 1 | 2 | H | | 1 | brown | brown-bordeaux | brown | brown-bordeaux |
| 26 | 2 | 2 | −COOH | (3) | 1 | " | " | " | " |
| 27 | 2 | 2 | −COOH | (3) | 2 | " | " | " | " |
| 28 | 3 | 2 | −CO−NH₂ | (3) | 1 | " | " | " | " |
| 29 | 3 | 2 | −CO−NH₂ | (3) | 2 | " | " | " | " |
| 30 | 4 | 2 | −SO₃H | (6) | 1 | " | " | " | " |
| 31 | 4 | 2 | −SO₃H | (6) | 2 | " | " | " | " |
| 32 | 5 | 1 | H | | 1 | " | " | " | " |
| 33 | 5 | 1 | H | | 2 | " | " | " | " |

Coupling components of formula (b₁₂)

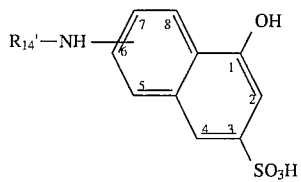

| Ex. no. | Kk. no. | position of −NH−R₁₄' | R₁₄' | Dk. no. | Shade on leather Mk. 1 chromium | Mk. 1 cobalt | Mk. 2 chromium | Mk. 2 cobalt |
|---|---|---|---|---|---|---|---|---|
| 34 | 6 | 6 | H | 1 | brown | bordeaux | brown | bordeaux |
| 35 | 6 | 6 | H | 2 | " | " | " | " |
| 36 | 7 | 7 | H | 1 | " | " | " | " |
| 37 | 7 | 7 | H | 2 | " | " | " | " |
| 38 | 8 | 6 | phenyl | 1 | " | " | " | " |
| 39 | 8 | 6 | " | 2 | " | " | " | " |
| 40 | 9 | 6 | −CO−phenyl | 1 | " | " | " | " |
| 41 | 9 | 6 | " | 2 | " | " | " | " |

Coupling components of formula (b₂) in which R₁₈ signifies H

| Ex. no. | Kk. no. | R₁₆ | R₁₇ | (position) | Dk. no. | Shade on leather Mk 1 chromium | Mk 1 cobalt | Mk. 2 chromium | Mk. 2 cobalt |
|---|---|---|---|---|---|---|---|---|---|
| 42 | 10 | −OH | H | | 1 | brown | brown-bordeaux | brown | brown-bordeaux |
| 43 | 10 | −OH | H | | 2 | brown | brown-bordeaux | brown | brown-bordeaux |

-continued

Coupling components of formula (b₂) in which $R_{18}$ signifies H

| Ex. no. | Kk. no. | $R_{16}$ | $R_{17}$ | (position) | Dk. no. | Shade on leather | | | |
| --- | --- | --- | --- | --- | --- | --- | --- | --- | --- |
| | | | | | | Mk 1 | | Mk. 2 | |
| | | | | | | chromium | cobalt | chromium | cobalt |
| 44 | 11 | —OH | —CH₃ | (4) | 1 | brown | brown-bordeaux | brown | brown-bordeaux |
| 45 | 11 | —OH | —CH₃ | (4) | 2 | brown | brown-bordeaux | brown | brown-bordeaux |
| 46 | 12 | —OH | —NH₂ | (3) | 1 | brown | brown-bordeaux | brown | brown-bordeaux |
| 47 | 12 | —OH | —NH₂ | (3) | 2 | brown | brown-bordeaux | brown | brown-bordeaux |
| 48 | 13 | —NH₂ | —NH₂ | (3) | 1 | brown | brown-bordeaux | brown | brown-bordeaux |
| 49 | 13 | —NH₂ | —NH₂ | (3) | 2 | brown | brown-bordeaux | brown | brown-bordeaux |
| 50 | 14 | —OH | —OH | (3) | 1 | brown | brown-bordeaux | brown | brown-bordeaux |
| 51 | 14 | —OH | —OH | (3) | 2 | brown | brown-bordeaux | brown | brown-bordeaux |

Coupling components of formula (b₃) in which $R_{20}$ signifies —CH₃

| Ex. no. | Kk. no. | $R_{21}$ | $R_{19}$ | Dk. no. | Shade on leather | | | |
| --- | --- | --- | --- | --- | --- | --- | --- | --- |
| | | | | | Mk. 1 | | Mk. 2 | |
| | | | | | chromium | cobalt | chromium | cobalt |
| 52 | 15 | =O | H | 1 | brown | brown | brown | brown |
| 53 | 15 | =O | H | 2 | " | " | " | " |
| 54 | 16 | =O | phenyl | 1 | " | " | " | " |
| 55 | 16 | =O | phenyl | 2 | " | " | " | " |
| 56 | 17 | =NH | phenyl | 1 | " | " | " | " |
| 57 | 17 | =NH | phenyl | 2 | " | " | " | " |
| 58 | 18 | =O | 4-SO₃H-phenyl | 1 | " | " | " | " |
| 59 | 18 | =O | " | 2 | " | " | " | " |
| 60 | 19 | =O | 4-SO₂NH₂-phenyl | 1 | " | " | " | " |
| 61 | 19 | =O | " | 2 | " | " | " | " |
| 62 | 20 | =O | 3-SO₃H-phenyl | 1 | " | " | " | " |
| 63 | 20 | =O | " | 2 | " | " | " | " |
| 64 | 21 | =O | 3-CF₃-phenyl | 1 | " | " | " | " |
| 65 | 21 | =O | " | 2 | " | " | " | " |

| | | Coupling components of formula ($b_4$) in which $R_{24}$ is methyl | | | | | | |
|---|---|---|---|---|---|---|---|---|
| | | | | | \multicolumn{4}{c}{Shade on leather} |
| Ex. no. | Kk. no. | $R_{22}$ | $R_{23}$ | Dk. no. | Mk. 1 chromium | Mk. 1 cobalt | Mk. 2 chromium | Mk. 2 cobalt |
| 66 | 22 | H | —CN | 1 | green | brown-bordeaux | green | brown-bordeaux |
| 67 | 22 | H | —CN | 2 | " | " | " | " |
| 68 | 23 | —(CH$_2$)$_3$—CH$_3$ | —CN | 1 | " | " | " | " |
| 69 | 23 | —(CH$_2$)$_3$—CH$_3$ | —CN | 2 | " | " | " | " |
| 70 | 24 | cyclohexyl | —CN | 1 | " | " | " | " |
| 71 | 24 | cyclohexyl | —CN | 2 | " | " | " | " |
| 72 | 25 | —CH$_2$—CH(CH$_3$)(CH$_2$)$_3$CH$_3$ | —CN | 1 | " | " | " | " |
| 73 | 25 | —CH$_2$—CH(CH$_3$)(CH$_2$)$_3$CH$_3$ | —CN | 2 | " | " | " | " |
| 74 | 26 | —CH$_3$ | —CN | 1 | " | " | " | " |
| 75 | 26 | —CH$_3$ | —CN | 2 | " | " | " | " |
| 76 | 27 | —C$_2$H$_5$ | —CONH$_2$ | 1 | " | " | " | " |
| 77 | 27 | —C$_2$H$_5$ | —CONH$_2$ | 2 | " | " | " | " |
| 78 | 28 | H | —$^+$N-pyridinium | 1 | " | " | " | " |
| 79 | 28 | H | —$^+$N-pyridinium | 2 | " | " | " | " |
| 80 | 29 | H | —$^+$N-(2-methylpyridinium) | 1 | " | " | " | " |
| 81 | 29 | H | —$^+$N-(2-methylpyridinium) | 2 | " | " | " | " |

| | | Coupling components of formula ($b_5$) in which $R_{26}$ signifies —OH | | | | | | |
|---|---|---|---|---|---|---|---|---|
| | | | | | \multicolumn{4}{c}{Shade on leather} |
| Ex. no. | Kk. no. | $R_{27}$ | $R_{25}$ | Dk. no. | Mk. 1 chromium | Mk. 1 cobalt | Mk. 2 chromium | Mk. 2 cobalt |
| 82 | 30 | —OH | —OH | 1 | brown | brown | brown | brown |
| 83 | 30 | —OH | —OH | 2 | " | " | " | " |
| 84 | 31 | —OH | —NH—CN | 1 | " | " | " | " |
| 85 | 31 | —OH | —NH—CN | 2 | " | " | " | " |
| 86 | 32 | —OH | phenylamino | 1 | " | " | " | " |
| 87 | 32 | —OH | phenylamino | 2 | " | " | " | " |
| 88 | 33 | —NH$_2$ | —NH$_2$ | 1 | " | " | " | " |
| 89 | 33 | —NH$_2$ | —NH$_2$ | 2 | " | " | " | " |
| 90 | 34 | —OH | —NH$_2$ | 1 | " | " | " | " |
| 91 | 34 | —OH | —NH$_2$ | 2 | " | " | " | " |

Coupling components of formula (b₇₁)

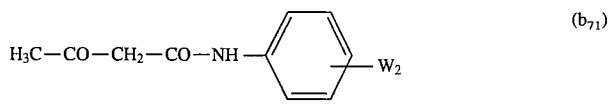

| Ex. no. | Kk. no. | W₂ | (position) | Dk. no. | Shade on leather |||| 
| | | | | | Mk. 1 || Mk. 2 ||
| | | | | | chromium | cobalt | chromium | cobalt |
|---|---|---|---|---|---|---|---|---|
| 92 | 35 | H | | 1 | brown | brown | brown | brown |
| 93 | 35 | H | | 2 | " | " | " | " |
| 94 | 36 | —SO₃H | (4) | 1 | " | " | " | " |
| 95 | 36 | —SO₃H | (4) | 2 | " | " | " | " |
| 96 | 37 | —SO₂NH₂ | (4) | 1 | " | " | " | " |
| 97 | 37 | —SO₂NH₂ | (4) | 2 | " | " | " | " |
| 98 | 38 | —SO₃H | (3) | 1 | " | " | " | " |
| 99 | 38 | —SO₃H | (3) | 2 | " | " | " | " |
| 100 | 39 | —CF₃ | (3) | 2 | " | " | " | " |
| 101 | 39 | —CF₃ | (3) | 2 | " | " | " | " |

Coupling components of formula (b₆)

| Ex. no. | Kk. no. | position of —OH | R₃₁ | Dk. no. | Shade on leather ||||
| | | | | | Mk. 1 || Mk. 2 ||
| | | | | | chromium | cobalt | chromium | cobalt |
|---|---|---|---|---|---|---|---|---|
| 102 | 40 | 8 | H | 1 | brown | brown-bordeaux | brown | brown-bordeaux |
| 103 | 40 | 8 | H | 2 | brown | brown-bordeaux | brown | brown-bordeaux |

EXAMPLE 104.1.1

The procedure described in Example 1.1.1 is repeated, with the difference that instead of Mk. 1 there is used the equimolar amount of Mk. 3, which is a middle component of formula (II) produced analogously as described for Mk. 1, with the difference that instead of N-acetylsulphanilyl chloride there is employed the equimolar amount of 1-acetylaminonaphthalene-4-sulphonic acid chloride. The obtained dark brown chromium complex dye corresponds in the form of the free acid to the formula

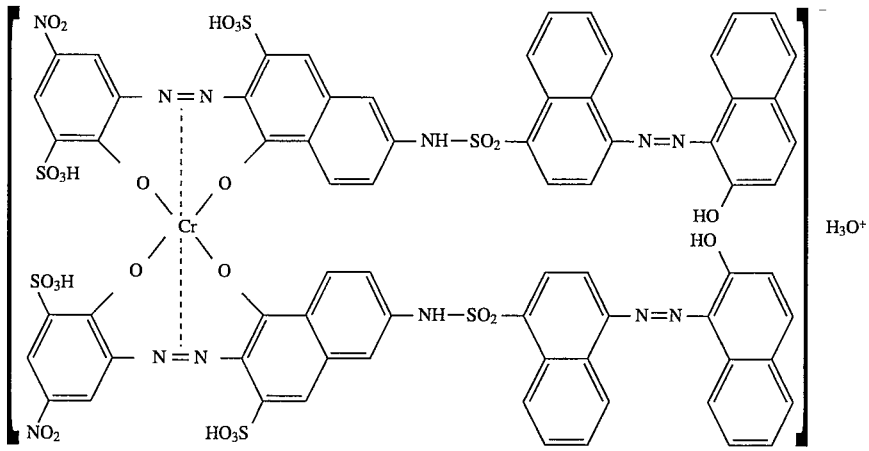

EXAMPLE 104.1.2

The procedure described in Example 104.1.1 is repeated, with the difference that instead of the chromation there is carried out a cobaltation analogously as described in Example 1.2.1. The obtained cobalt complex dye dyes leather in dark bordeaux-brown shades.

EXAMPLE 104.2.1

The procedure described in Example 1.2.1 is repeated, with the difference that instead of Mk. 2 there is used the equimolar amount of Mk. 4, which is a middle component of formula (II) produced analogously as described for Mk. 2, with the difference that instead of N-acetylsulphanilyl chloride there is employed the equimolar amount of 1-acetylaminonaphthalene-4-sulphonic acid chloride. The obtained dark brown chromium complex dye corresponds in the form of the free acid to the formula

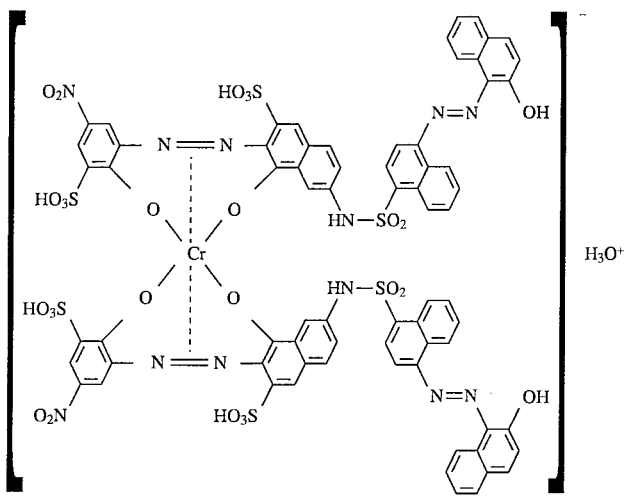

EXAMPLE 104.2.2

The procedure described in Example 104.2.1 is repeated, with the difference that instead of the chromation there is carried out a cobaltation analogously as described in Example 1.2.2. The obtained cobalt complex dye dyes leather in dark bordeaux-brown shades.

APPLICATION EXAMPLE A 100 parts of a wet blue bovine box side leather are neutralized in a dyeing drum with 250 parts of water and 0.8 parts of sodium carbonate at 35° C. during 45 minutes. The leather is then washed with 1000 parts of water at 25° C. After 5 minutes the leather is dyed at 50° C. with 250 parts of water and 0.8 parts of the 1:2 chromium complex dye produced according to Example 1.1.1, previously dissolved in 80 parts of water of 50° C. After 20 minutes 4 parts of an 80% emulsion of a sulphited fish oil are added for fatting and fatting is continued for 45 minutes. Then the bath is acidified with 0.5 parts of an 85% formic acid solution and drumming is continued for 20 minutes. Finally, the liquor is drained off and the leather is rinsed at 25° C. with 1000 parts of water. The leather is drained, dried and cured in conventional way. A leather dyed with a level brown shade with outstanding fastnesses (in particular wet fastnesses, fastness to dry cleaning, fastness to light and resistance to PVC migration) is obtained.

APPLICATION EXAMPLE B 100 parts of an intermediately dried chrome-tanned suede split leather are wetted back with 800 parts of water at 50° C., 2 parts of 25% ammonia solution and 0.5 parts of the adduct of 10 moles of ethylene oxide to 1 mol of nonylphenol for 90 minutes; the bath is then drained off and 600 parts of water at 50° C., 1 part of a 25% ammonia solution and 1 part of a fat-liquoring agent (an emulsion of fatty acid esters) are added. After 10 minutes, 4 parts of the 1:2 chromium complex dye produced according to Example 1.1.1, previously dissolved in 400 parts of water of 50° C., are added for pre-dyeing. After 60 minutes, 2 parts of an 85% formic acid solution are added and drumming is continued for 20 minutes. 2 parts of a 20% solution of the product obtained by quaternization with dimethylsulphate of the benzylation product of diethylenetriamine are then added and after 20 minutes 2 parts of the same dyestuff as used for pre-dyeing, previously dissolved in 200 parts of water of 50° C., are added. Drumming is continued for 40 minutes, then the bath is acidified with two additions of each time 1.5 parts of an 85% formic acid solution at an interval of 10 minutes between the two additions. After 10 minutes the bath is drained off and the leather is rinsed, drained, dried and cured as usual. There is obtained a leather dyed in a level brown shade with outstanding fastnesses (in particular wet fastnesses, fastness to dry cleaning, fastness to light and resistance to PVC migration).

APPLICATION EXAMPLE C 100 parts of chrome-tanned bovine upholstery leather is wetted back with 800 parts of water, 2 parts of a 25% ammonia solution and 3 parts of the adduct of 10 moles of ethylene oxide to 1 mol of nonylphenol at 50° C. during 90 minutes. The bath is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). 6 parts of the 1:2 chromium complex dye obtained in Example 1.1.1, previously dissolved in 600 parts of water of 50° C., are added and drumming is continued for 60 minutes. The bath is then acidified with two subsequent additions of each time 1.5 parts of an 85% formic acid solution, at an interval of 10 minutes. After 10 minutes the leather is rinsed, drained, dried and cured as conventional. There is obtained a leather dyed in a level and intensive brown shade with outstanding fastnesses (in particular wet fastnesses, fastness to dry cleaning, fastness to light and resistance to PVC migration).

APPLICATION EXAMPLE D 100 parts of chrome-tanned bovine upholstery leather is wetted back with 800 parts of water, 2 parts of a 25% ammonia solution and 3 parts of the adduct of 10 moles of ethylene oxide to 1 mol of nonylphenol at 50° C. during 90 minutes. The liquor is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). The leather is then pre-dyed with 4 parts of the 1:2 chromium complex dye obtained in Example 1.1.1, previously dissolved in 400 parts of water of 50° C. After 60 minutes, the bath is acidified with 1 part of an 85% formic acid solution and, after 10 minutes, 2 parts of a 20% solution of the product obtained by quaternization with dimethylsulphate of the benzylation product of diethylenetriamine are added. The bath is drained off after 20 minutes and the leather is dyed at 50° C. with 400 parts of water and 2 parts of the same dyestuff as used before for pre-dyeing, previously dissolved in 200 parts of water of 50° C., for 40 minutes. The bath is then acidified with 1 part of an 85% formic acid solution and, after 20 minutes, the leather is rinsed, drained, dried and cured as conventional. There is obtained a leather dyed in a level and intensive brown shade with outstanding fastnesses (in particular wet fastnesses, fastness to dry cleaning, fastness to light and resistance to PVC migration).

APPLICATION EXAMPLE E 100 parts of low affinity chrome/vegetable tanned bovine leather is wetted back at 50° C. with 1000 parts of water and 0.2 parts of the adduct of 10 moles of ethylene oxide to 1 mole of nonylphenol during 90 minutes. The bath is then drained off and the leather is dyed at 50° C. with 1000 parts of water and 4 parts of the 1:2 chrome complex dye obtained in Example 1.1.1, previously dissolved in 400 parts of water of 50° C. After 1 hour, the bath is acidified with 2 parts of an 85% formic acid solution, and after 20 minutes the leather is rinsed, drained, dried and cured as conventional. There is obtained a leather dyed in a level and intensive brown shade with outstanding fastnesses (in particular wet fastnesses, fastness to dry cleaning, fastness to light and resistance to PVC migration).

APPLICATION EXAMPLE EBIS

The procedure described in Application Example E is repeated, with the difference that instead of 4 parts of the chromium complex dye according to Example 1.1.1 there is employed a mixture of 2 parts of the chromium complex dye according to Example 1.1.1 and 2 parts of the dye C.I. Acid Yellow 243. There is obtained a leather dyed in a corresponding mixed brown shade.

APPLICATION EXAMPLE ETER

The procedure described in Application Example E is repeated, with the difference that instead of 4 parts of the chromium complex dye according to Example 1.1.1 there is employed a mixture of 2 parts of the chromium complex dye according to Example 1.1.1 and 2 parts of the dye C.I. Acid Black 233. There is obtained a leather dyed in a corresponding mixed dark brown shade.

APPLICATION EXAMPLE EQUATER

The procedure described in Application Example E is repeated, with the difference that instead of 4 parts of the chromium complex dye according to Example 1.1.1 there is employed a mixture of 2 parts of the chromium complex dye according to Example 1.1.1 and 2 parts of the dye C.I. Acid Brown 432. There is obtained a leather dyed in a corresponding mixed full brown shade.

APPLICATION EXAMPLE F 100 parts of semichrome sheep leather are wetted back at 45° C. with 1000 parts of water and 0.5 parts of an amphoteric masking agent (a sulpho group containing fatty acid aminoamide) for 1 hour. The leather is pre-dyed with 800 parts of water of 50° C. and 6 parts of the 1:2 chromium complex dye obtained in Example 1.1.1, previously dissolved in 600 parts of water of 50° C. Drumming is continued until the dye has penetrated inside the leather. The bath is then acidified with 1.5 parts of an 85% formic acid solution and, after 20 minutes, 2 parts of a 20% solution of the product obtained by quaternization with dimethylsulphate of the benzylation product of diethylenetriamine are added. After 20 minutes the leather is dyed with 6 parts of the same dye as used for pre-dyeing, previously dissolved in 600 parts of water of 50° C., for 40 minutes. The bath is then acidified with 2 parts of an 85% formic acid solution and after 30 minutes the leather is rinsed, drained, dried and cured as conventional. There is obtained a leather dyed in a level and intensive brown shade with outstanding fastnesses (in particular wet fastnesses, fastness to dry cleaning, fastness to light and resistance to PVC migration).

APPLICATION EXAMPLE G 100 parts of chrome-tanned crust bovine leather for upholstery are wetted back at 35° C. with 300 parts of water and 0.5 parts of an amphoteric masking agent (a sulpho group containing fatty acid aminoamide) for 20 minutes. The bath is drained off an the leather is retanned at 35° C. with 150 parts of water, 1 part of a phenolic syntan (65% solution of the condensation product of phenol and sulphuric acid) and 3 parts of a 40% solution of dimethyloldihydroxyethylene urea. After 30 minutes 1.5 parts of sodium formate are added and, after 15 minutes 5 parts of a polypeptide-based retanning agent are added. Drumming is continued for 30 minutes and then the pH of the bath is set to 6 by addition of 1.5 parts of sodium bicarbonate. After 30 minutes the leather is washed for 10 minutes with 300 parts of water at 40° C. Then 150 parts of water at 45° C., 1 part of a fat-liquoring agent (an emulsion of fatty acid esters), 1 part of a 25% ammonia solution and 0.5 parts of a phenolic syntan (condensation product of phenol and sulphuric acid) are added. After 15 minutes the leather is dyed with 3 parts of the 1:2 chromium complex dye obtained in Example 1.1.1, previously dissolved in 300 parts of water of 50° C., during 90 minutes, i.e. until the dye has fully penetrated. 2 parts of an emulsion of fatty acid esters, 3 parts of a mixture of an esterified synthetic fatty alcohol and a phosphoric acid partial ester of an ethoxylated fatty alcohol and 6 parts of an emulsion of a sulphited fish-oil are added for fat-liquoring and, after 60 minutes, 2 parts of a hydrosoluble melamine-formaldehyde condensate are added for fixation. Drumming is continued for 20 minutes and then the bath is acidified with two additions of each time 0.75 parts of an 85% formic acid solution diluted with water 1:20 v/v, with an interval of 10 minutes between the two additions. After 10 minutes the leather is rinsed, drained, dried and cured as conventional. There is obtained a leather dyed in a level brown shade with outstanding fastnesses (in particular wet fastnesses, fastness to dry cleaning, fastness to light and resistance to PVC migration).

APPLICATION EXAMPLE H 100 parts of sheep nappa are washed at 40° C. with 200 parts of water and 0.5 parts of an amphoteric masking agent (a sulpho group containing fatty acid aminoamide) for 20 minutes. The bath is drained off, 200 parts of water at 35° C. and 1.2 parts of sodium formate are added and drumming is continued for 15 minutes. 4 parts of a polypeptide-based retanning agent are then added and after 30 minutes 0.6 parts of sodium carbonate are added to adjust the pH of the bath to 5.8–6.0. After 40 minutes 4 parts of polyacrylic acid-based retanning agent are added and drumming is continued for 30 minutes; 2 parts of a water soluble urea-formaldehyde condensate are then added and after 30 minutes the bath is drained off. Then 150 parts of water at 40° C., 1 part of a 25% ammonia solution and 2 parts of a fat-liquoring agent (an emulsion of fatty acid esters) are added. After 10 minutes the leather is dyed with 3 parts of the 1:2 chromium complex dye obtained in Example 1.1.1, previously dissolved in 300 parts of water of 50° C., during 90 minutes. 2 parts of an emulsion of fatty acid esters, 6 parts of an emulsion of a sulphited fish-oil and 3 parts of an aqueous emulsion of fatty alcohol phosphoric acid partial esters are added for fat-liquoring. Drumming is continued for 60 minutes and then the bath is acidified with 1.5 parts of an 85% formic acid solution. After 30 minutes the bath is drained off and the leather is rinsed, drained, dried and cured as conventional. There is obtained a leather dyed in a level brown shade with outstanding fastnesses (in particular wet fastnesses, fastness to dry cleaning, fastness to light and PVC migration resistance).

APPLICATION EXAMPLE I

Application Example H is repeated, with the difference that after fat-liquoring and before the conclusive formic acid addition the bath is drained off, 200 parts of water at 50° C. and 2 parts of a hydrosoluble polymeric reaction product of epichlorohydrin and dimethylamine are added, drumming is continued for 30 minutes, thereafter 0.5 parts of 2-fatty alkyl imidazoline are added and drumming is continued for further 20 minutes. The bath is then drained off and the leather is rinsed, drained, dried and cured as conventional. There is obtained a leather dyed in a level brown shade with outstanding fastnesses (in particular wet fastnesses, fastness to dry cleaning, fastness to light and resistance to PVC migration).

Analogously as the brown dye according to Example 1.1.1, in sodium salt form, the dyes of each of Examples 1.1.2 to 104.2.2 are used in each of the above Application Examples A to I, by which there are also obtained dyeings of corresponding shade, depths and fastnesses.

We claim:

1. A 1:2 metal complex of (i) a polyazo compound of formula

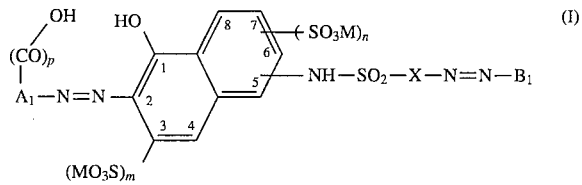

wherein

—$A_1$—$(CO)_p$—OH signifies the radical of a diazo component of formula $H_2N$—A—$(CO)_p$—OH, in which the substituent —$(CO)_p$—OH is in ortho-position to the diazotizable amino group, $NH_2$, —A— is a bivalent aromatic radical, and p signifies 0 or 1, —X— signifies a bivalent aromatic radical, —$B_1$ signifies the radical of a coupling component, HB, m signifies 0 or 1, n signifies 0,1 or 2, and M signifies hydrogen or a cation, with the proviso that m+n=1 or 2;

(ii) two different polyazo compounds of said formula (I);

(iii) a polyazo compound of formula (I) and one or more chromophoric or a non-chromophoric complex-forming ligands provided that said chromophoric or a non-chromophoric complex-forming ligands are not polyazo compounds of formula (I);

or a mixture of such complexes.

2. A 1:2 metal complex or 1:2 metal complex mixture according to claim 1, wherein the compounds of formula (I) correspond to formula

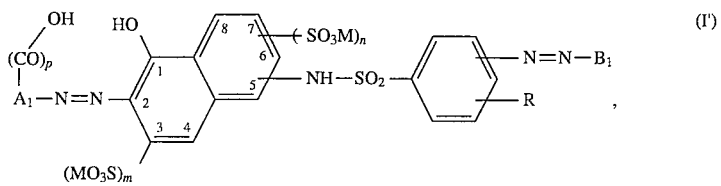

wherein R signifies hydrogen or methyl.

3. A 1:2 metal complex or mixture according to claim 1, wherein —$A_1$—$(CO)_p$—OH is the radical of a benzene or naphthalene diazo component, —$B_1$ is the radical of a benzene, naphthalene, heterocyclic or open-chain methylene-active coupling component, and the complex-forming metal is iron, chromium or cobalt.

4. A 1:2 metal complex according to (i), (ii) or (iii) of claim 1 having the formula

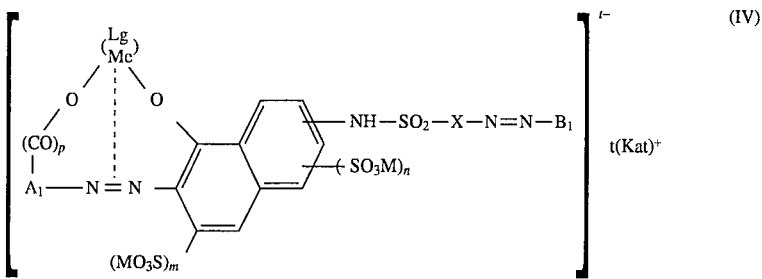

wherein
Me signifies a 1:2 complex-forming metal;
Lg signifies one or more chromophoric or non-chromophoric complex-forming ligands;
t is the number of negative charges of the 1:2 metal complex; and $(Kat)^+$ signifies a cation, or a mixture of such complexes.

5. A metal complex according to claim 4 of the formula

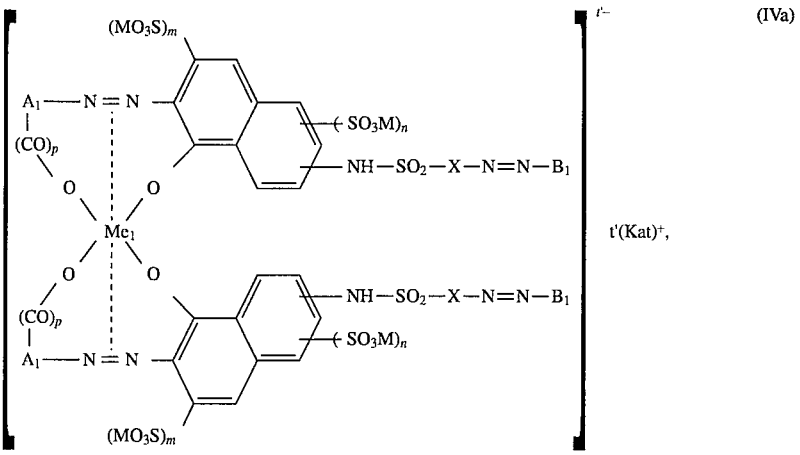

wherein $Me_1$ signifies iron, cobalt or chromium and t' signifies 0 or 1, or a mixture of such complexes.

6. A metal complex according to claim 5 of the formula

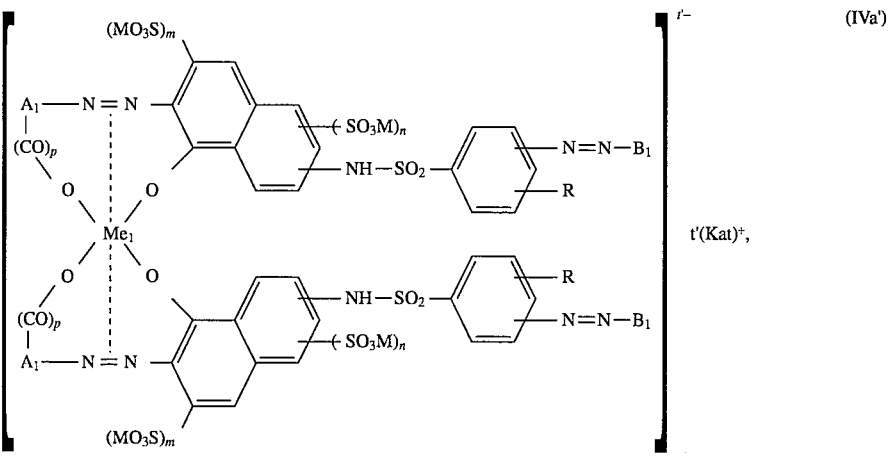

wherein R signifies hydrogen or methyl, or a mixture of such complexes.

7. A 1:2 metal complex according to claim 1 wherein the coupling component, HB, is selected from the group consisting of

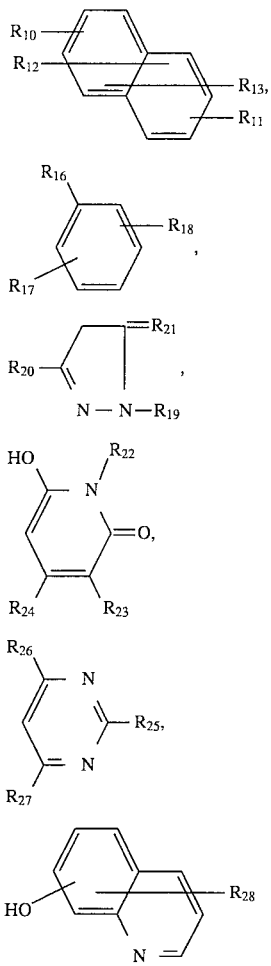

(b₁)

(b₂)

(b₃)

(b₄)

(b₅)

(b₆)

and $R_{29}-G-CO-CH_2-CO-R_{30}$, (b₇)

wherein $R_{10}$ signifies hydrogen, —$OR_{14}$ or —$NHR_{14}$;

$R_{11}$ signifies —$OR_{14}$ or —$NHR_{14}$;

$R_{12}$ signifies hydrogen, —$SO_3M$, —$SO_2NR_3R_4$, —COOM or —$CONR_3R_4$;

$R_{13}$ signifies hydrogen, —$SO_3M$, —$SO_2NR_3R_4$, —COOM or —$CONR_3R_4$;

$R_3$ signifies hydrogen, $C_{1-4}$-alkyl, $C_{1-3}$-alkylene-$R_5$ or $C_{2-3}$-hydroxyalkyl;

$R_4$ signifies hydrogen, $C_{1-4}$-alkyl, $C_{1-3}$-alkylene-$R_5$ or $C_{2-3}$-hydroxyalkyl, benzyl, or a radical of the formula

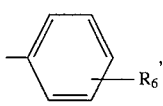

(c₁)

$R_5$ signifies nitrile, carbamoyl or —COOM;

$R_6$ signifies hydrogen, methyl, chlorine, nitro, —COOM or —$SO_3M$;

$R_{14}$ signifies hydrogen, $C_{1-4}$-alkyl, Ac' or a radical of formula

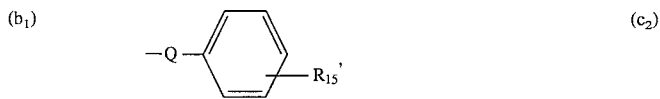

(c₂)

Ac' signifies the acyl radical of an aliphatic carboxylic acid;

Q signifies —CO—, —$SO_2$— or a direct bond;

$R_{15}$ signifies hydrogen, methyl, —NH—Ac, —COOM, or —$NO_2$, or, if in formula (c₂) Q signifies —CO— or —$SO_2$—, then $R_{15}$ can also be —$NH_2$;

$R_{16}$ signifies —OH or —$NH_2$;

$R_{17}$ signifies hydrogen, $C_{1-4}$-alkyl, $C_{1-4}$-alkoxy, —OH, —NR'R" or —NH—Ac;

$R_{18}$ signifies hydrogen, $C_{1-4}$-alkyl, $C_{1-4}$-alkoxy;

R' and R" independently signify hydrogen, $C_{1-2}$-alkyl or $C_{2-3}$-hydroxyalkyl;

$R_{19}$ signifies hydrogen, sulphonaphthyl or a radical of formula

(c₃)

$W_1$ signifies hydrogen, halogen, methyl, methoxy or —COOM;

$W_2$ signifies hydrogen, halogen, trifluoromethyl, nitrile, nitro, —COOM, —$SO_3M$ or —$SO_2NR_3R_4$;

$R_{20}$ signifies $C_{1-4}$-alkyl, phenyl, —COOM, —$CONR_3R_4$, —$COOCH_3$ or —$COOC_2H_5$;

$R_{21}$ signifies =O or =NH;

$R_{22}$ signifies hydrogen, unsubstituted amino, phenylamino, sulphonaphthyl, open-chain $C_{1-8}$-alkyl, $C_{6-9}$-cycloalkyl, carboxy-($C_{1-4}$-alkyl), $C_{2-4}$-alkylsubstituted with hydroxy, methoxy, ethoxy or a sulpho group in one of the positions β to ω, or a radical of formula (C₃);

$R_{23}$ signifies hydrogen, nitrilo, acetyl, —COOM, carbamoyl, —$SO_3M$, pyridinio or 2-methylpyridinio, in which where $R_{23}$ stands for pyridinio or orthomethylpyridinio, any of the sulpho groups present may be in the form of the anion, —$SO_3^-$ forming an inner salt counterion;

$R_{24}$ signifies hydrogen, hydroxy, methyl, carboxy, phenyl, sulphomethyl or carbamoyl;

$R_{25}$ signifies hydroxy, primary amino, nitrilamino, thiol or a radical of formula

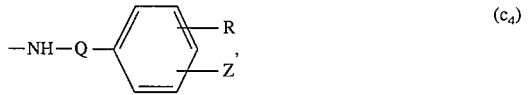

(c₄)

$R_{26}$ signifies hydroxy or primary amino;

$R_{27}$ signifies hydroxy or primary amino;

$R_{28}$ signifies hydrogen, methyl, chlorine, chloromethyl or chloroacetyl;

G signifies —O—, —NH—, or a direct bond;

$R_{29}$ signifies naphthyl, sulphonaphthyl or disulphonaphthyl or a radical of formula (C₃);

$R_{30}$ signifies $C_{1-4}$-alkyl; and

Z signifies hydrogen, —$NH_2$, —OH, $C_{1-4}$-alkoxy, a mono- or di-($C_{1-4}$-alkyl)amino group or an acylamino group.

8. A 1:2 metal complex according to claim 1 wherein H$_2$N—A—(CO)$_p$—OH is selected from the group consisting of

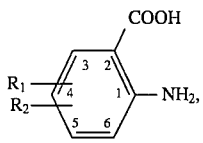 (a$_1$)

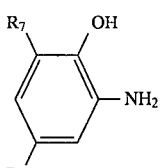 (a$_2$)

and

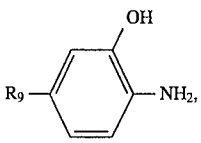 (a$_3$)

wherein

R$_1$ signifies hydrogen, nitro, —SO$_3$M or —SO$_2$NR$_3$R$_4$;

R$_2$ signifies hydrogen, nitro, —SO$_3$M or —SO$_2$NR$_3$R$_4$;

R$_3$ signifies hydrogen, C$_{1-4}$-alkyl, C$_{1-3}$-alkylene-R$_5$ or C$_{2-3}$-hydroxyalkyl;

R$_4$ signifies hydrogen, C$_{1-4}$-alkyl, C$_{1-3}$-alkylene-R$_5$ or C$_{2-3}$-hydroxyalkyl, benzyl, or a radical of the formula

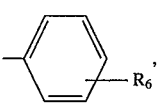 (c$_1$)

R$_5$ signifies nitrile, carbamoyl or —COOM;

R$_6$ signifies hydrogen, methyl, chlorine, nitro, —COOM or —SO$_3$M;

R$_7$ Signifies hydrogen, halogen, nitro, —SO$_3$M, —SO$_2$NR$_3$R$_4$, methylsulphonyl, C$_{1-4}$-alkyl or —NH—Ac;

R$_8$ signifies hydrogen, halogen, nitro, —SO$_3$M, —SO$_2$NR$_3$R$_4$, methylsulphonyl, C$_{1-4}$-alkyl or —NH—Ac;

R$_9$ signifies nitro, —SO$_3$M or —SO$_2$NR$_3$R$_4$; and

Ac signifies an aliphatic acyl group.

9. A 1:2 metal complex of (i) a polyazo compound of formula

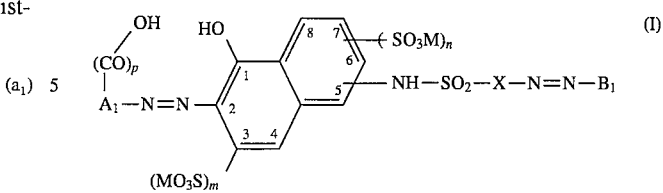 (I)

wherein

—A$_1$—(CO)$_p$—OH signifies the radical of a diazo component of formula H$_2$N—A—(CO)$_p$—OH, in which the substituent —(CO)$_p$—OH is in ortho-position to the diazotizable amino group, NH$_2$, —A— is a bivalent aromatic radical and p signifies 0 or 1, —X— signifies a bivalent aromatic radical, —B$_1$— signifies the radical of a coupling component, HB, m signifies 0 or 1, n signifies 0, 1 or 2, and M signifies hydrogen or a cation, with the proviso that m+n=1 or 2;

(ii) two different polyazo compounds of said formula (I); or a mixture of such complexes.

10. A 1:2 metal complex according to claim 9 corresponding to (i).

11. A 1:2 metal complex according to claim 10 wherein the polyazo compound is of formula (I')

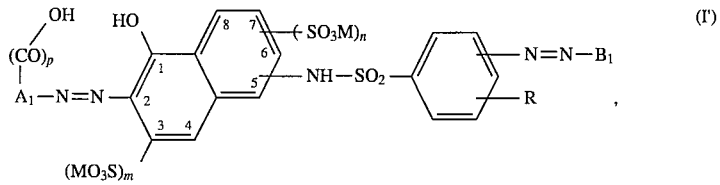 (I')

wherein R signifies hydrogen or methyl.

12. A 1:2 metal complex or mixture according to claim 10, wherein

—A$_1$—(CO)$_p$—OH is the radical of a benzene or naphthalene diazo component,

—B$_1$ is the radical of a benzene, naphthalene, heterocyclic or open-chain methylene-active coupling component, and the complex-forming metal of the 1:2 metal complex is iron, chromium or cobalt.

13. A 1:2 metal complex according to (iii) of claim 1 comprising a polyazo compound and a non-chromophoric, complex-forming ligand.

14. A 1:2 metal complex according to claim 13 wherein the non-chromophoric, complex-forming ligand is selected from coordinatively linkable aliphatic polyamines or hydroxycarboxylic acids.

15. A 1:2 metal complex according to claim 13 wherein the non-chromophoric, complex-forming ligand additionally includes water or ammonia.

16. A 1:2 metal complex according to claim 13 wherein the non-chromophoric, complex-forming ligand additionally includes water and ammonia.

17. A 1:2 metal complex according to (iii) of claim 1 comprising a polyazo compound and chromophoric, complex-forming ligand.

18. A 1:2 metal complex according to claim 17 wherein the chromophoric, complex-forming ligand is a metallizable azo compound.

19. A 1:2 metal complex of a polyazo compound of formula

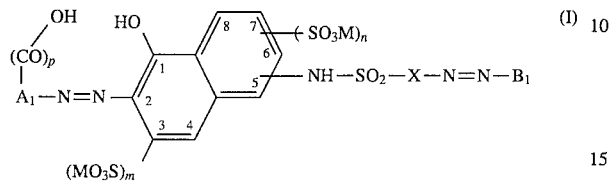

wherein $-A_1-(CO)_p-OH$ signifies the radical of a diazo component of formula $H_2N-A-(CO)_p-OH$;

$H_2N-A-(CO)_p-OH$ is selected from the group consisting of

and

wherein $R_1$ signifies hydrogen, nitro, $-SO_3M$ or $-SO_2NR_3R_4$;

$R_2$ signifies hydrogen, nitro, $-SO_3M$ or $-SO_2NR_3R_4$;

$R_3$ signifies hydrogen, $C_{1-4}$-alkyl, $C_{1-3}$-alkylene-$R_5$ or $C_{2-3}$-hydroxyalkyl;

$R_4$ signifies hydrogen, $C_{1-4}$-alkyl, $C_{1-3}$-alkylene-$R_5$ or $C_{2-3}$-hydroxyalkyl, benzyl, or a radical of the formula

$R_5$ signifies nitrile, carbamoyl or $-COOM$;

$R_6$ signifies hydrogen, methyl, chlorine, nitro, $-COOM$ or $-SO_3M$;

$R_7$ Signifies hydrogen, halogen, nitro, $-SO_3M$, $-SO_2NR_3R_4$, methylsulphonyl, $C_{1-4}$-alkyl or $-NH-Ac$;

$R_8$ signifies hydrogen, halogen, nitro, $-SO_3M$, $-SO_2NR_3R_4$, methylsulphonyl, $C_{1-4}$-alkyl or $-NH-Ac$;

$R_9$ signifies nitro, $-SO_3M$ or $-SO_2NR_3R_4$; and

Ac signifies an aliphatic acyl group;

X signifies a phenylene or naphthalene radical;

$B_1$ signifies the radical of a coupling component, HB;

HB is selected from the group consisting of

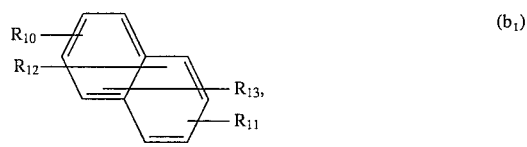

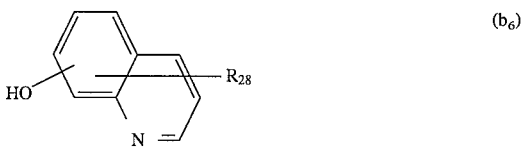

and

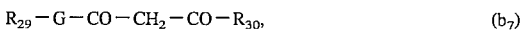

wherein $R_{10}$ signifies hydrogen, $-OR_{14}$ or $-NHR_{14}$;

$R_{11}$ signifies $-OR_{14}$ or $-NHR_{14}$;

$R_{12}$ signifies hydrogen, $-SO_3M$, $-SO_2NR_3R_4$, $-COOM$ or $-CONR_3R_4$;

$R_{13}$ signifies hydrogen, $-SO_3M$, $-SO_2NR_3R_4$, $-COOM$ or $-CONR_3R_4$;

$R_3$ signifies hydrogen, $C_{1-4}$-alkyl, $C_{1-3}$-alkylene-$R_5$ or $C_{2-3}$-hydroxyalkyl;

$R_4$ signifies hydrogen, $C_{1-4}$-alkyl, $C_{1-3}$-alkylene-$R_5$ or $C_{2-3}$-hydroxyalkyl, benzyl, or a radical of the formula

$R_5$ signifies nitrile, carbamoyl or $-COOM$;

$R_{14}$ signifies hydrogen, $C_{1-4}$-alkyl, Ac' or a radical of formula

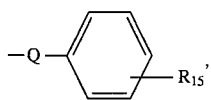

Ac' signifies the acyl radical of an aliphatic carboxylic acid;

Q signifies —CO—, —SO$_2$— or a direct bond;

R$_{15}$ signifies hydrogen, methyl, —NH—Ac, —COOM, or —NO$_2$, or, if in formula (c$_2$) Q signifies —CO— or —SO$_2$—, then R$_{15}$ can also be —NH$_2$;

R$_{16}$ signifies —OH or —NH$_2$;

R$_{17}$ signifies hydrogen, C$_{1-4}$-alkyl, C$_{1-4}$-alkoxy, —OH, —NR'R" or —NH—Ac;

R$_{18}$ signifies hydrogen, C$_{1-4}$-alkyl, C$_{1-4}$-alkoxy;

R' and R" independently signify hydrogen, C$_{1-2}$-alkyl or C$_{2-3}$-hydroxyalkyl;

R$_{19}$ signifies hydrogen, sulphonaphthyl or a radical of formula

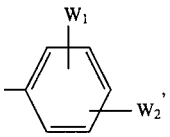

W$_1$ signifies hydrogen, halogen, methyl, methoxy or —COOM;

W$_2$ signifies hydrogen, halogen, trifluoromethyl, nitrile, nitro, —COOM, —SO$_3$M or —SO$_2$NR$_3$R$_4$;

R$_{20}$ signifies C$_{1-4}$-alkyl, phenyl, —COOM, —CONR$_3$R$_4$, —COOCH$_3$ or —COOC$_2$H$_5$;

R$_{21}$ signifies =O or =NH;

R$_{22}$ signifies hydrogen, unsubstituted amino, phenylamino, sulphonaphthyl, open-chain C$_{1-8}$-alkyl, C$_{6-9}$-cycloalkyl, carboxy-(C$_{1-4}$-alkyl), C$_{2-4}$-alkylsubstituted with hydroxy, methoxy, ethoxy or a sulpho group in one of the positions β to ω, or a radical of formula (C$_3$);

R$_{23}$ signifies hydrogen, nitrilo, acetyl, —COOM, carbamoyl, —SO$_3$M, pyridinio or 2-methylpyridinio, in which where R$_{23}$ stands for pyridinio or orthomethylpyridinio, any of the sulpho groups present may be in the form of the anion, —SO$_3^-$ forming an inner salt counterion;

R$_{24}$ signifies hydrogen, hydroxy, methyl, carboxy, phenyl, sulphomethyl or carbamoyl;

R$_{25}$ signifies hydroxy, primary amino, nitrilamino, thiol or a radical of formula

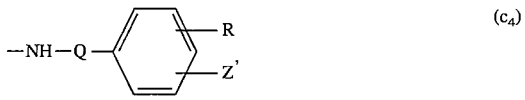

R$_{26}$ signifies hydroxy or primary amino;

R$_{27}$ signifies hydroxy or primary amino;

R$_{28}$ signifies hydrogen, methyl, chlorine, chloromethyl or chloroacetyl;

G signifies —O—, —NH—, or a direct bond;

R$_{29}$ signifies naphthyl, sulphonaphthyl or disulphonaphthyl or a radical of formula (C$_3$);

R$_{30}$ signifies C$_{1-4}$-alkyl; and

Z signifies hydrogen, —NH$_2$, —OH, C$_{1-4}$-alkoxy, a mono- or di-(C$_{1-4}$-alkyl)amino group or an acylamino group;

m signifies 0 or 1, n signifies 0,1 or 2, and M signifies hydrogen or a cation, with the proviso that m+n=1 or 2.

20. A 1:2 metal complex according to claim 19 wherein X is a phenylene radical.

21. A 1:2 metal complex according to claim 20 wherein said phenylene radical is substituted with one or more groups selected from the group consisting of C$_{1-4}$-alkyl, C$_{1-4}$-alkoxy and chlorine.

22. A process for the dyeing of a substrate dyeable with anionic dyes, comprising applying a 1:2 metal complex or a mixture thereof according to claim 1 to a substrate dyeable with anionic dyes.

23. A process according to claim 22 wherein said substrate is selected from the group consisting of leather and pelts.

* * * * *